(12) United States Patent
Ruan et al.

(10) Patent No.: US 12,551,429 B2
(45) Date of Patent: Feb. 17, 2026

(54) ORAL CARE COMPLEXES AND COMPOSITIONS

(71) Applicant: Colgate-Palmolive Company, New York, NY (US)

(72) Inventors: Qichao Ruan, Hillsborough, NJ (US); Stacey Lavender, Chesterfield, NJ (US)

(73) Assignee: Colgate-Palmolive Company, New York, NY (US)

( * ) Notice: Subject to any disclaimer, the term of this patent is extended or adjusted under 35 U.S.C. 154(b) by 220 days.

(21) Appl. No.: 18/068,421

(22) Filed: Dec. 19, 2022

(65) Prior Publication Data

US 2023/0201101 A1 Jun. 29, 2023

Related U.S. Application Data

(60) Provisional application No. 63/293,342, filed on Dec. 23, 2021.

(51) Int. Cl.
| | | |
|---|---|---|
| *A61K 8/88* | (2006.01) | |
| *A61K 8/365* | (2006.01) | |
| *A61K 8/84* | (2006.01) | |
| *A61Q 11/00* | (2006.01) | |

(52) U.S. Cl.
CPC ........... *A61K 8/88* (2013.01); *A61K 8/365* (2013.01); *A61K 8/84* (2013.01); *A61Q 11/00* (2013.01); *A61K 2800/5424* (2013.01); *A61K 2800/5426* (2013.01)

(58) Field of Classification Search
CPC . A61K 8/88; A61K 8/365; A61K 8/84; A61K 2800/5424; A61K 2800/5426; A61K 2800/594; A61Q 11/00; A61P 43/00
See application file for complete search history.

(56) References Cited

U.S. PATENT DOCUMENTS

| | | | |
|---|---|---|---|
| 8,980,229 | B2 | 3/2015 | Pilch et al. |
| 2006/0171906 | A1 | 8/2006 | Singh et al. |
| 2017/0042829 | A1* | 2/2017 | Mao et al. ........... A61K 9/5192 |

FOREIGN PATENT DOCUMENTS

| | | | | |
|---|---|---|---|---|
| CA | 2557783 | | 10/2005 | |
| EP | 3725756 | * | 10/2020 | |
| JP | H05310544 | * | 11/1993 | |
| JP | H05310544 A | | 11/1993 | |
| JP | 2002338602 | * | 11/2002 | ............ A61L 27/00 |
| WO | 2015370455 | * | 6/2016 | ............ C05G 3/08 |

OTHER PUBLICATIONS

Giron-Gonzalez et al., Polyelectrolyte Complexes of Low Molecular Weight PEI and Citric Acid as Efficient and Nontoxic Vectors for in Vitro and in Vivo Gene Delivery, 2016, Bioconjugate Chemistry, vol. 27/Issue 3, (Year: 2016).*

P.M. et al., Polyelectrolytes, Thermodynamics and Rheology, Springer Cham Heidelberg New York Dordrecht London (2014) 1-349 (Year: 2014).*

Yokoyama et al. (Development of calcium phosphate cement using chitosan and citric acid for bone substitute materials, Elsevier vol. 23, Issue 4, Feb. 15, 2002, pp. 1091-1101) (Year: 2002).*

Bellich et al. ("The Good, the Bad and the Ugly" of Chitosans) Mar. Drugs 2016, 14(5), 99; https://doi.org/10.3390/md14050099 (Year: 2016).*

Chen et al., "Regeneration of biomimetic hydroxyapatite on etched human enamel by anionic PAMAM template in vitro," Archives of Oral Biology 58:975-980 (2013).

Gao et al., "Enamel remineralization via poly(amido amine) and adhesive resin containing calcium phosphate nanoparticles," Journal of Dentistry 92:103262 (2020).

Kukowska-Latallo et al., "Efficient transfer of genetic material into mammalian cells using Starburst polyamidoamine dendrimers," Proc. Natl. Acad. Sci. USA, 93, 4897-4902 (1996).

Santos et al., "Dendrimers as Pharmaceutical Excipients: Synthesis, Properties, Toxicity and Biomedical Applications," Materials 13:65 (2020).

Tomalia et al., "A New Class of Polymers: Starburst-Dendritic Macromolecules," Polymer Journal, 17(1):117-132 (1985).

"Drug for treating dental caries and periodontal diseases—contains epsilon-poly-L-lysine having good antimicrobial effect", Derwent, 1992.

Avanti et al., 2020, "Effect of Polymer-Induced Liquid Precursor Process Containing Polyaspartic Acid on Intrafibrillar Dentin Remineralization (Micro-Computed Tomography Analysis)", International Journal of Applied Pharmaceutics, pp. 41-44.

Chen et al., 2020, "Advances of Anti-Caries Nanomaterials", Molecules, 25(21):5047.

International Search Report and the Written Opinion of the International Searching Authority issued in International Application PCT/US2022/053412 mailed May 12, 2023.

Liang et al., 2019, "Dental remineralization via poly(amido amine) and restorative materials containing calcium phosphate nanoparticles", International Journal of Oral Science, 11(2).

(Continued)

*Primary Examiner* — Robert A Wax
*Assistant Examiner* — Kimberly Barber

(57) ABSTRACT

The present invention relates to a polyelectrolyte complex, and compositions thereof, for use in the treatment or prevention of dental caries, early erosive damage, and enamel demineralization, and the promotion of enamel repair and remineralization. This oral care composition comprises polyelectrolyte complexes comprising cationic polymers and anionic carboxylates.

16 Claims, 4 Drawing Sheets
(2 of 4 Drawing Sheet(s) Filed in Color)

(56) References Cited

OTHER PUBLICATIONS

Pietrokovski et al., 2016, "Antibacterial effect of composite resin foundation material incorporating quaternary ammonium polyethyleneimine nanoparticles Core foundation material supplied by BJM Laboratories Ltd", https://reader.elsevier.com/reader/sd/pii/S0022391316001645?token=A357F416E077B3AF37B42FBDCDF5542DC8B1DF93CAE49197E797317E95E059C5EA9BE9CF3748386D9E3FE38D341B8BBE&originRegion=eu-west-1&originCreation=20230 504102110.

* cited by examiner

1. Cover the left half of enamel block

2. Acid etching

3. Cover the top half of enamel block

4. Repair treatment

5. Remove the covers

6. Visualization and measurement

ORAL CARE COMPLEXES AND COMPOSITIONS

CROSS-REFERENCE TO RELATED APPLICATIONS

This application claims priority to, and the benefit of, U.S. Provisional Application No. 63/293,342, filed on Dec. 23, 2021, the contents of which are hereby incorporated by reference in its entirety.

FIELD

The present invention relates to a polyelectrolyte complex, and compositions thereof, for use in the treatment or prevention of dental caries, early erosive damage, and enamel demineralization, and the promotion of enamel repair and remineralization. This oral care composition comprises polyelectrolyte complexes comprising cationic polymers and anionic carboxylates.

BACKGROUND

Dental plaque is a sticky biofilm or mass of bacteria that is commonly found between the teeth, along the gum line, and below the gum line margins. Dental plaque can give rise to dental caries and periodontal problems such as gingivitis and periodontitis. Dental caries tooth decay or tooth demineralization caused by acid produced from the bacterial degradation of fermentable sugar.

Enamel is the outermost layer of the mammalian tooth and the most mineralized tissue in the human body. It consists of over 95% by weight of minerals, and less than 5% by weight of water and organic materials. The primary mineral is elongated (carbonated) hydroxyapatite crystals that are densely packed and organized into an intricate interwoven structure. The high mineral content together with its organized structure provides enamel with significant resilience that protects the tooth from daily use such as chewing, biting, crunching, and grinding. Although enamel is a hard protector of teeth, it can be damaged by external chemical and physical insults. Unlike a broken bone that can be repaired by the body, the mature enamel is a non-living tissue and cannot regenerate itself after substantial mineral loss, which often occurs as dental caries or erosion.

Enamel erosion is one of the most common dental diseases and it is a growing problem. The development of enamel erosion involves a demineralization process characterized by acid dissolution of enamel crystals, not involving acids of bacterial origin. Since enamel erosion results in progressive and irreversible loss of mineralized tooth substance, the primary focus of erosion intervention is prevention and reduction, followed by management. Currently, the conventional method for preventing enamel erosion is to remineralize the softened enamel by providing essential ions, such as fluoride, calcium, and phosphate. It is well recognized that fluoride can promote the formation of fluoridate apatite on enamel and provide a better resistance to acid. Recent evidence indicates that materials containing calcium phosphate can also protect the teeth against erosion. Although these technologies have shown effects in protecting enamel, none of them could truly repair the enamel once it is damaged.

In addition, one of the hallmarks of early erosive tooth damage is "microdamage," which refers to surface damage of the enamel visible only on a microscopic scale. Normal enamel surface has a fairly uniform smooth appearance. Acid damage causes a considerable roughening of the surface due to leaching of mineral ions (calcium and phosphate) from the surface structure (hydroxyapatite crystals). Physical damage can also occur, such as microscopic nicks and scratches in the surface of the enamel. Both of these types of microdamage can lead to localized areas of weakness and increased diffusion of acid and stains into the weakened enamel, as well as increased bacterial colonization. Furthermore, the rough surface resulting from such erosion can lead to unpleasant tooth appearance, such as a reduction in gloss or shine.

Recently, the biomimetic reconstruction of tooth enamel has been proposed as a potential approach for prevention, restoration, and treatment of defective enamel. For example, this method could form an amorphous calcium phosphate that is further attached with natural enamel and eventually evolve into the hydroxyapatite crystals. Various biomimetic systems have been developed to stabilize the amorphous precursor phase, including liquids or pastes that contain proteins, peptides, amino acids or other charged polymers. During the biomimetic repair process, the enamel-like co-aligned crystals could be formed to provide the defective enamel with improved mechanical properties. However, the biomimetic growth of a repaired enamel layer usually takes an extended amount of time (from several hours to days, sometimes even a few weeks) in the classical biomimetic strategies, which will dramatically limit the application of these materials in the clinical setting.

Poly(amidoamine), or PAMAM, is a class of dendrimer which is made of repetitively branched subunits of amide and amine functionality. PAMAM dendrimers, sometimes referred to by the trade name Starburst, have been extensively studied since their synthesis in 1985, and represent the most well-characterized dendrimer family as well as the first to be commercialized. Like other dendrimers, PAMAMs have a sphere-like shape overall, and are typified by an internal molecular architecture consisting of tree-like branching, with each outward 'layer', or generation, containing exponentially more branching points. This branched architecture distinguishes PAMAMs and other dendrimers from traditional polymers, as it allows for low polydispersity and a high level of structural control during synthesis, and gives rise to a large number of surface sites relative to the total molecular volume. Moreover, PAMAM dendrimers exhibit greater biocompatibility than other dendrimer families, perhaps due to the combination of surface amines and interior amide bonds; these bonding motifs are highly reminiscent of innate biological chemistry and endow PAMAM dendrimers with properties similar to that of globular proteins. The relative ease/low cost of synthesis of PAMAM dendrimers (especially relative to similarly-sized biological molecules such as proteins and antibodies), along with their biocompatibility, structural control, and ability to be further functionalized, have made PAMAMs viable candidates for application in drug development, biochemistry, and nanotechnology.

Polyamino acids are a class of synthetic and/or naturally occurring heteropolymers or homopolymers of amino acids. When composed of L-amino acids, these polymers are easily hydrolyzed in the body to form free amino acids. Cationic amino acid homopolymers are particularly useful. Various polylysine homopolymers are known, finding numerous uses in the food and pharmaceutical industries. The basic amino acids lysine, arginine, and histidine, each have a second basic group in addition to the alpha amino group. In lysine, the second basic group is another primary amino group, while in arginine and histidine, the second basic group is a guanidine group and an imidazole ring, respectively. Thus, polymers comprising these amino acids, along with any other non-acidic amino acids, are basic and cationic polymers. Alpha-polylysine is a polylysine homopolymer in which the amide bonds are formed between the alpha-amino group and alpha carboxylic acid group of adjacent residues. In contrast, epsilon-polylysine is a polylysine homopolymer in which the amide bonds are formed between the side chain amino group (the epsilon amino group) and the alpha carboxylic acid group of adjacent residues.

Both alpha-polylysine and epsilon-polylysine are commercially manufactured, and epsilon-polylysine is considered GRAS (generally recognized as safe). Alpha-polylysine is available composed of either D-lysine or L-lysine residues, while epsilon-polylysine is available composed of L-lysine residues. D-polylysine (PDL) and L-polylysine (PLL) are both used in biological research as a coating for tissue culture dishes, and PLL is also used as an excipient for drug delivery. Epsilon-polylysine is used as a natural food preservative. While alpha-polylysine polymers are manufactured commercially using a synthetic polycondensation reaction, epsilon-polylysine is manufactured by the natural fermentation of Streptomyces albulus bacteria. Epsilon-polylysine has been reported to have antimicrobial activity.

None of the existing methods of treating caries or early erosive demineralization are successful in correcting the microdamage present in damaged enamel. There remains a need for providing improved methods for promoting the remineralization of damaged enamel and preventing enamel demineralization and caries.

BRIEF SUMMARY

Disclosed herein are oral care compositions comprising polyelectrolyte complexes comprising cationic polymers and anionic carboxylates. Methods of manufacturing such compositions, and methods of using such compositions are also described throughout. In some embodiments, the cationic polymer is a polyamidoamine dendrimer (PAMAM) or polyethyleneimine (PEI), and the anionic carboxylate is an organic dicarboxylic acid, or a salt thereof. In some embodiments, the cationic polymer is a polyamine polymer, such as a polyamine homopolymer, preferably comprising one or more basic amino acid (e.g., lysine, arginine, histidine) The compositions disclosed herein provide improved protection from demineralization and enhanced remineralization of damaged enamel. In some embodiments, the oral care composition is a toothpaste, gel, serum, mouth spray, or mouthwash.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
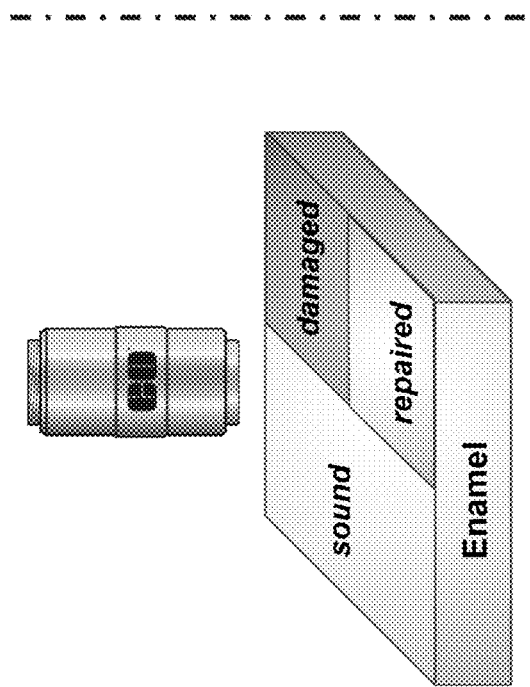
FIG. 1. Schematic image for quantification and visualization of the enamel repair efficacy, as described in Example 4.

The following description of the preferred embodiment(s) is merely exemplary in nature and is in no way intended to limit the disclosure, its application, or uses.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight of the entire composition. The amounts given are based on the active weight of the material.

Polyelectrolytes are polymers in which a substantial portion of the monomeric units have ionic or ionizable groups. Polyelectrolytes may comprise polymeric cations (polycations), polymeric anions (polyanions), or a combination. Polyelectrolytes may comprise a polycation complexed with non-polymeric anions, a polyanion complexed with non-polymeric cations, or a polycation complexed with a polyanion. Depending on the length and charge density of any polymeric components and the charge density of any counterions, the ratio between anionic moieties and cationic moieties in the polyelectrolyte complex may vary. Where the polyelectrolyte complex comprises polycations and polyanions the ratio between them may vary based on the length or charge of the individual polymeric species. Preferably, the ratio is maintained in order to provide a significant net charge on the complex (e.g., a significant positive charge).

It has been surprisingly found that polyelectrolyte complexes, as described herein, are capable of adhering to damaged tooth enamel and consequently modifying the surface charge of the enamel. This charge modification results in enhanced ion migration to the enamel surface which enhances natural enamel repair mechanisms.

The erosion of dental enamel results from acid dissolution of hydroxyapatite (HAP) crystals. The demineralization which results causes an uneven surface with a more random charge distribution compared to normal enamel. Normal remineralization of this uneven surface is achieved through a heterogeneous nucleation process controlled by gradient-based ion diffusion. This is a slow and very non-uniform process, and results in only limited natural repair at the surface.

Without being bound theory, it is believed that treatment of the enamel with a polyelectrolyte complex according to the present disclosure results in the adherence of the charged polymers to the enamel surface, which modifies the roughness and unevenness of the surface. As a result, normal remineralization processes occur more rapidly and more uniformly. It is further believed that the combination of the cationic polymer and the anionic counterions results in modification of charge distribution across the enamel surface which results in accelerated ion migration to the surface and further enhanced enamel repair.

As used herein, the term "cationic polymer" refers to a polymer which can exist in a cationic state (i.e., positively charged) but may also exist in a neutral state (i.e., no net charge). Likewise, the term "anionic polymer" refers to a polymer which can exist in an anionic state (i.e., negatively charged) but may also exist in a neutral state (i.e., no net charge). As would be understood by the skilled artisan, cationic polymers are generally Bronsted bases, and thus, they are cationic when protonated and neutral when deprotonated. Likewise, as would be understood by the skilled artisan, anionic polymers are generally Bronsted acids, and thus, they are anionic when deprotonated and neutral when protonated. For both types of polymers, the protonation state will depend on the pH of the medium, and it is not implied that in any particular complex or composition disclosed herein that a cationic polymer or anionic polymer has a particular protonation state, unless otherwise stated.

In one aspect, the present disclosure therefore provides a polyelectrolyte complex (Complex 1) comprising a cationic polymer and an anionic polymer or anionic carboxylate. In further embodiments of this aspect, the present disclosure provides:

1.1 Complex 1, wherein the polyelectrolyte complex comprises a cationic polymer selected from a polyamidoamine dendrimer (PAMAM) and polyethyleneimine (PEI).
1.2 Complex 1.1, wherein the cationic polymer is a PAMAM dendrimer.
1.3 Complex 1.2, wherein the PAMAM dendrimer is comprised of repeating units derived from ethylene diamine and methyl acrylate.
1.4 Complex 1.2 or 1.3, wherein the PAMAM dendrimer comprises from 3-9 generations of growth
1.5 Complex 1.4, wherein the PAMAM dendrimer comprises 3-6 generations of growth (e.g., 3, 4 or 5), optionally 4 generations of growth.
1.6 Any of Complexes 1.2-1.5, wherein the PAMAM dendrimer has terminal or capping groups attached to the amino-terminated or carboxylic-terminated PAMAM core.
1.7 Complex 1.6, wherein the PAMAM dendrimer has 16 to 1024 terminal groups, e.g., 16, 32, 64, 128, 256, 512 or 1024 terminal groups, optionally 64 terminal groups.
1.8 Complex 1.6 or 1.7, wherein the dendrimer terminal groups are amino groups (e.g., wherein there are no capping groups).
1.9 Any one of Complexes 1.2-1.8, wherein the dendrimer has the following structure:

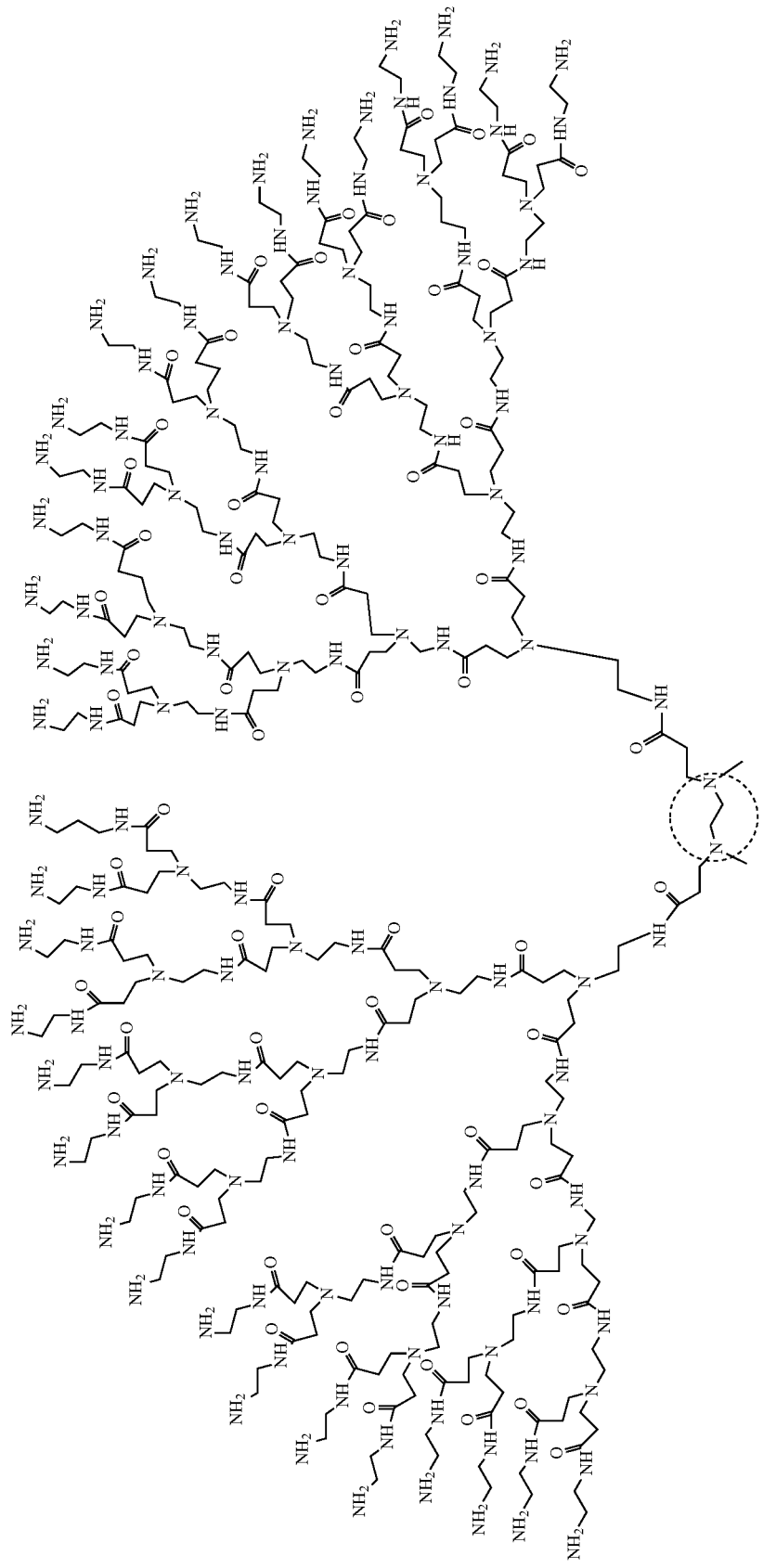

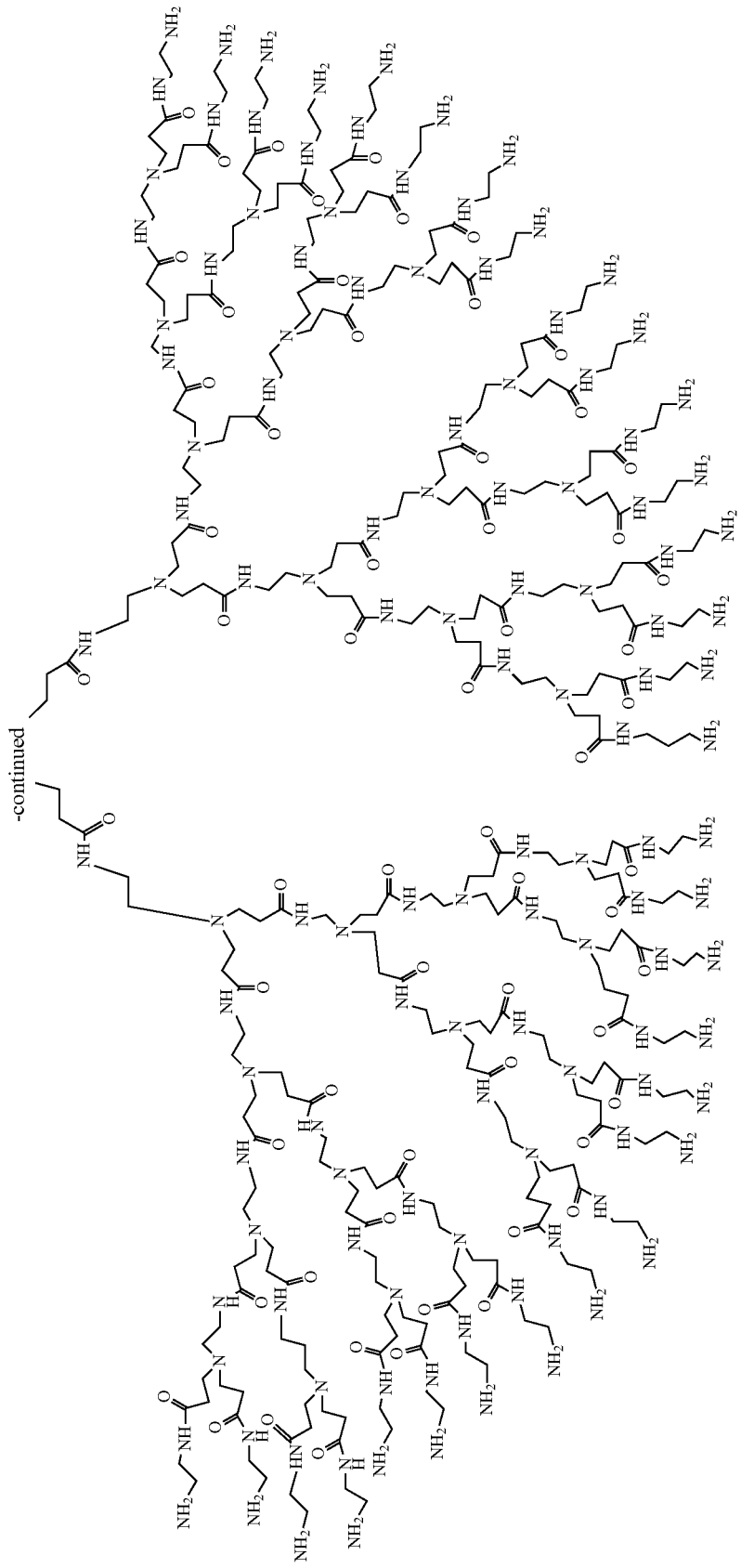
-continued 1.10 Complex 1.1, wherein the cationic polymer is a poly(ethyleneimine) polymer.
1.11 Complex 1.10, wherein the polyethyleneimine polymer has the following structure:

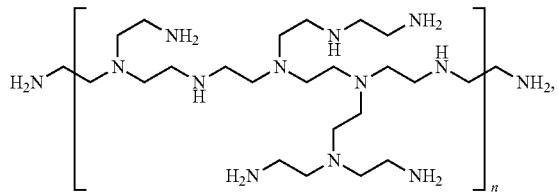

wherein n is an integer from 10 to 1000, e.g., 10 to 500, or 10 to 250, or 10 to 200, or 10 to 150, or 10 to 100, or 10 to 75, or 25 to 500, or 25 to 250, or 25 to 200, or 25 to 150, or 25 to 100, or 25 to 75, or about 50.
1.12 Complex 1, or any of 1.1-1.11, wherein the cationic polymer has a molecular weight of 1000 to 250,000; e.g., 1000 to 200,000, or 1000 to 150,000, or 1000 to 100,000, or 1000 to 75,000, or 1000 to 50,000, or 1000 to 25,000, or 1000 to 20,000, or 1000 to 15,000, or 1000 to 10,000, or 1000 to 7500, or 1000 to 5000, or 2000 to 20,000, or 2000 to 15,000, or 2000 to 10,000, or 2000 to 7500, or 2000 to 5000, or 4000 to 20,000, or 4000 to 15,000, or 4000 to 12,000, or 4000 to 10,000, or 4000 to 7500, or 5000 to 20,000, or 5000 to 15,000, or 5000 to 12,000, or 5000 to 7500, or 7000 to 20,000, or 7000 to 15,000, or 7000 to 12,000, or 7000 to 10,000, or 7000 to 9000, or 5000 to 500,000, or 5000 to 250,000, or 5000 to 200,000, or 5000 to 150,000, or 5000 to 100,000, or 5,000 to 75,000, or 5,000 to 50,000, or 10,000 to 250,000, or 10,000 to 200,000 or 10,000 to 150,000 or 10,000 to 100,000, or 10,000 to 75,000, or 10,000 to 50,000, 15,000 to 150,000, or 15,000 to 100,000, or 15,000 to 75,000, or 15,000 to 50,000, or 15,000 to 35,000, or 20,000 to 30,000, or about 25,000.
1.13 Complex 1, wherein the polyelectrolyte complex comprises a cationic polymer which is a polyamino acid comprising one or more basic amino acid residues (e.g., lysine, arginine, and/or histidine).
1.14 Complex 1.13, wherein the polyamino acid is a heteropolymer consisting only of neutral and basic amino acid residues (e.g., lysine, arginine, and/or histidine) (i.e., no acidic amino acid residues, e.g., glutamic acid, aspartic acid).
1.15 Complex 1.14, wherein the polyamino acid is a block copolymer, e.g., comprising blocks of basic amino acids (e.g., lysine, arginine, histidine) alternating with blocks of neutral amino acids (e.g., glycine, alanine, valine, leucine, isoleucine, serine, threonine, asparagine, glutamine, tyrosine);
1.16 Complex 1.13, wherein the polyamino acid is a homopolymer consisting of basic amino acid residues (e.g., lysine, arginine, and/or histidine).
1.17 Complex 1.16, wherein the polyamino acid is a polylysine homopolymer.
1.18 Complex 1.17, wherein the polylysine homopolymer is alpha-polylysine, optionally consisting of D-lysine residues (DLL) or L-lysine residues (PDL).
1.19 Complex 1.17, wherein the polylysine homopolymer is epsilon-polylysine, optionally consisting of D-lysine residues or L-lysine residues.
1.20 Any of Complexes 1.13-1.19, wherein the amino acids in the polyamino acid are all D-amino acids (e.g., D-lysine).
1.21 Any of Complexes 1.13-1.19, wherein the amino acids in the polyamino acid are all L-amino acids (e.g., L-lysine).
1.22 Any of Complexes 1.13-1.21, wherein the polyamino acid consists of 100 to 3000 amino acid residues, e.g., 100 to 2000, or 100 to 1500, or 100 to 1000, or 100 to 500, or 100 to 300, or 100 to 200, or 500 to 3000, or 500 to 2500, or 500 to 2000, or 500 to 1500 amino acid residues.
1.23 Any of Complexes 1.13-1.21, wherein the polyamino acid consists of 10 to 300 amino acid residues, e.g., 10 to 200, or 10 to 150, or 10 to 100, or 10 to 50, or 10 to 40, or 20 to 50, or 20 to 40, or 25 to 35 amino acid residues.
1.24 Any of Complexes 1.13-1.21, wherein the polyamino acid has a molecular weight of 10,000 to 1,000,000 Daltons, e.g., 10,000 to 500,000, or 10,000 to 300,000, or 20,000 to 500,000, or 20,000 to 300,000, or 30,000 to 500,000, or 30,000 to 300,000, or 30,000 to 250,000, or 30,000 to 200,000, or 30,000 to 150,000, or 30,000 to 100,000, or 30,000 to 50,000, or 50,000 to 500,000, or 50,000 to 300,000, or 100,000 to 500,000, or 100,000 to 300,000, or 150,000 to 500,000, or 150,000 to 300,000 Daltons.
1.25 Any of Complexes 1.13-1.21, wherein the polyamino acid has a molecular weight of 10,000 to 1,000,000 Daltons, e.g., 10,000 to 500,000, or 10,000 to 300,000, or 20,000 to 500,000, or 20,000 to 300,000, or 30,000 to 500,000, or 30,000 to 300,000, or 30,000 to 250,000, or 30,000 to 200,000, or 30,000 to 150,000, or 30,000 to 100,000, or 30,000 to 50,000, or 50,000 to 500,000, or 50,000 to 300,000, or 100,000 to 500,000, or 100,000 to 300,000, or 150,000 to 500,000, or 150,000 to 300,000 Daltons.
1.26 Any of Complexes 1.13-1.25, wherein the polyamino acid is a salt, e.g., a hydrochloride or hydrobromide salt.
1.27 Any of Complexes 1.13-1.25, wherein the polyamino acid is alpha-poly-D-lysine having a molecular weight of 150,000-300,000 Da, and/or 700-1500 D-lysine residues, optionally as a hydrobromide salt.
1.28 Any of Complexes 1.13-1.25, wherein the polyamino acid is alpha-poly-L-lysine having a molecular weight of 30,000-60,000 Da, and/or 30-60 L-lysine residues, optionally as a hydrochloride salt.
1.29 Any of Complexes 1.13-1.25, wherein the polyamino acid is epsilon-poly-L-lysine (ePL) having a molecular weight of 3000-5000, and/or 25-35 L-lysine residues, optionally in the form of a free base.
1.30 Complex 1 or any of 1.1-1.29, wherein the anionic polymer is a polyacrylic acid polymer or a polystyrene sulfonate polymer.
1.31 Complex 1 or any of 1.1-1.29, wherein the anionic carboxylate is an organic monocarboxylic, dicarboxylic, or tricarboxylic acid (e.g., acetic acid, lactic acid, glycolic acid, tartaric acid, malic acid, malonic acid, succinic acid, glutaric acid, maleic acid, fumaric acid, mandelic acid, or citric acid).
1.32 Complex 1.31, wherein the anionic carboxylate is a dicarboxylic acid, such as maleic acid or malic acid.
1.33 Complex 1.32, wherein the anionic carboxylate is malic acid;
1.34 Any one of Complexes 1.31-1.33, wherein the polyelectrolyte complex comprises a cationic polymer and an anionic carboxylate in a molar ratio sufficient to provide a cationic complex (i.e., a larger number of cationic charged groups compared to anionic charged groups or a larger number of basic groups compared to acidic groups).

1.35 Complex 1.34, wherein the polyelectrolyte complex comprises a molar ratio of cationic polymer amino groups to anionic polymer or anionic carboxylate groups of 1:0.01 to 1:1, e.g., 1:0.01 to 1:0.9, or 1:0.01 to 1:0.75, or 1:0.01 to 1:0.5, or 1:0.01 to 1:0.45, or 1:0.01 to 1:0.4, or 1:0.05 to 1:0.9, or 1:0.05 to 1:0.75, or 1:0.05 to 1:0.5, or 1:0.05 to 1:0.45, or 1:0.05 to 1:0.4, or 1:0.1 to 1:0.9, or 1:0.1 to 1:0.75, or 1:0.1 to 1:0.5, or 1:0.1 to 1:0.45, or 1:0.1 to 1:0.4, or 1:0.1 to 1:0.3, or about 1:0.1, or about 1:0.03, or about 1:0.5.

1.36 Any one of Complexes 1.1-1.35, wherein the polyelectrolyte complex comprises a cationic polymer and an anionic carboxylate in a weight ratio of about 1:0.001 to 1:1, e.g., 1:0.001 to 1:0.7, or 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or 1:0.001 to 1:0.04, or 1:0.001 to 1:0.02, or 1:0.001 to 1:0.01, or 1:0.001 to 1:0.008, or 1:0.001 to 1:0.007, or 1:0.001 to 1:0.006, or about 1:0.003 to 1:0.015, or 1:0.004 to 1:0.013, or about 1:0.06, or about 1:0.03, or about 1:0.01, or about 1:0.006.

1.37 Any of Complexes 1.1-1.36, wherein the cationic polymer is PDL having a molecular weight of 150,000-300,000 Da, and/or 700-1500 D-lysine residues, optionally as a hydrobromide salt, and the anionic carboxylate is malic acid, and the weight ratio of the PDL to the malic acid is 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or about 1:0.06.

1.38 Any of Complexes 1.1-1.36, wherein the cationic polymer is PLL having a molecular weight of 30,000-60,000 Da, and/or 30-60 L-lysine residues, optionally as a hydrochloride salt, and the anionic carboxylate is malic acid, and the weight ratio of the PLL to the malic acid is 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or about 1:0.06.

1.39 Any of Complexes 1.1-1.36, wherein the cationic polymer is ePL having a molecular weight of 3000-5000, and/or 25-35 L-lysine residues, optionally in the form of a free base, and the anionic carboxylate is malic acid, and the weight ratio of the ePL to the malic acid is 1:0.001 to 1:0.01, or 1:0.001 to 1:0.008, or 1:0.001 to 1:0.007, or 1:0.001 to 1:0.006, or about 1:0.003 to 1:0.015, or 1:0.004 to 1:0.013, or about 1:0.01, or about 1:0.006.

In another aspect, the present disclosure provides an oral care composition (Composition 1), comprising a polyelectrolyte complex comprising a cationic polymer and an anionic polymer or anionic carboxylate. In further embodiments of this aspect, the present disclosure provides:

1.1 Composition 1, wherein the polyelectrolyte complex comprises a cationic polymer selected from a polyamidoamine dendrimer (PAMAM) and polyethyleneimine (PEI).

1.2 Composition 1.1, wherein the cationic polymer is a PAMAM dendrimer.

1.3 Composition 1.2, wherein the PAMAM dendrimer is comprised of repeating units derived from ethylene diamine and methyl acrylate.

1.4 Composition 1.2 or 1.3, wherein the PAMAM dendrimer comprises from 3-9 generations of growth 1.5 Composition 1.4, wherein the PAMAM dendrimer comprises 3-6 generations of growth (e.g., 3, 4 or 5), optionally 4 generations of growth.

1.6 Any of Compositions 1.2-1.5, wherein the PAMAM dendrimer has terminal or capping groups attached to the amino-terminated or carboxylic-terminated PAMAM core.

1.7 Composition 1.6, wherein the PAMAM dendrimer has 16 to 1024 terminal groups, e.g., 16, 32, 64, 128, 256, 512 or 1024 terminal groups, optionally 64 terminal groups.

1.8 Composition 1.6 or 1.7, wherein the dendrimer terminal groups are amino groups (e.g., wherein there are no capping groups).

1.9 Any one of Compositions 1.2-1.8, wherein the dendrimer has the following structure:

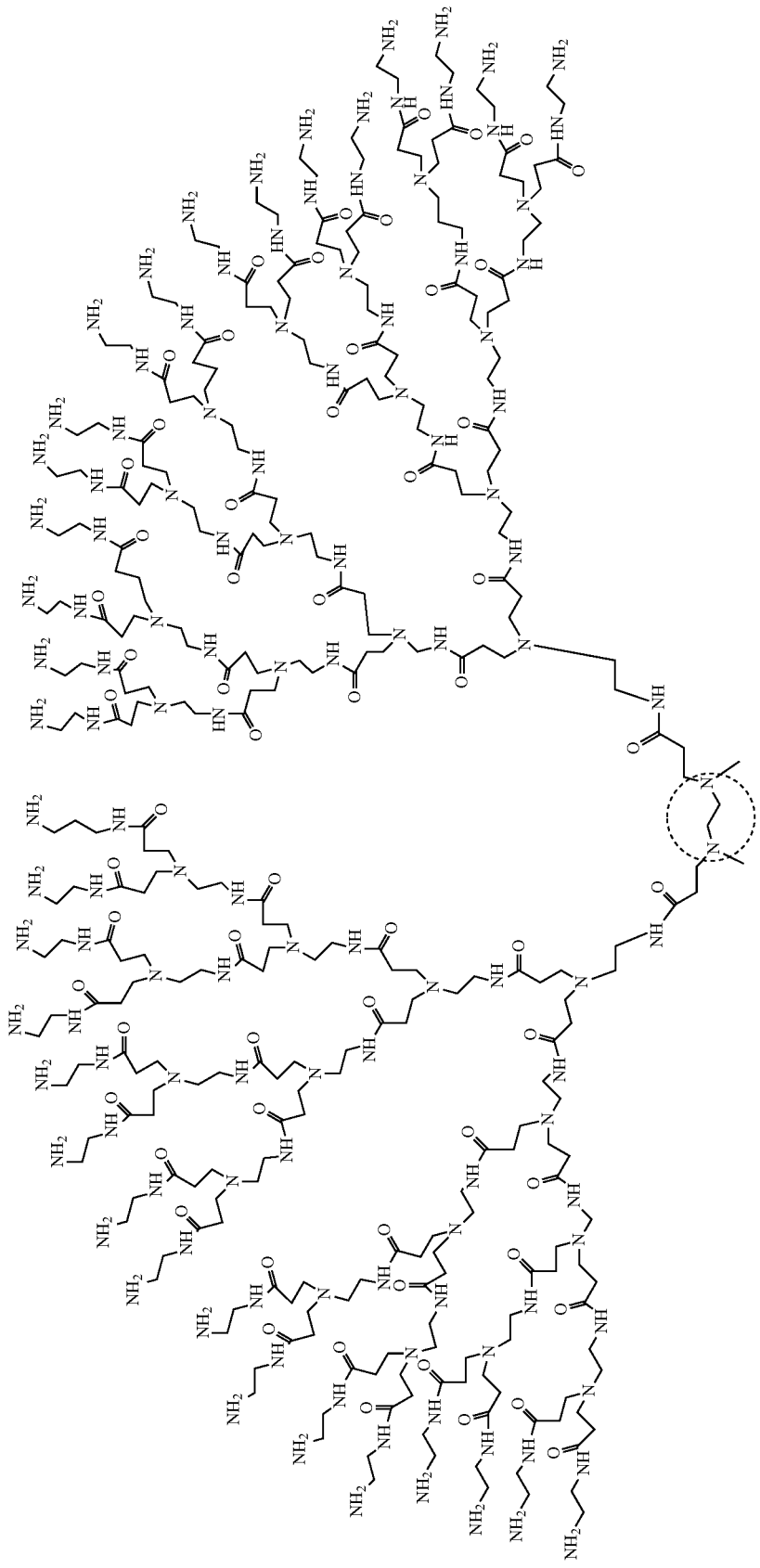

-continued
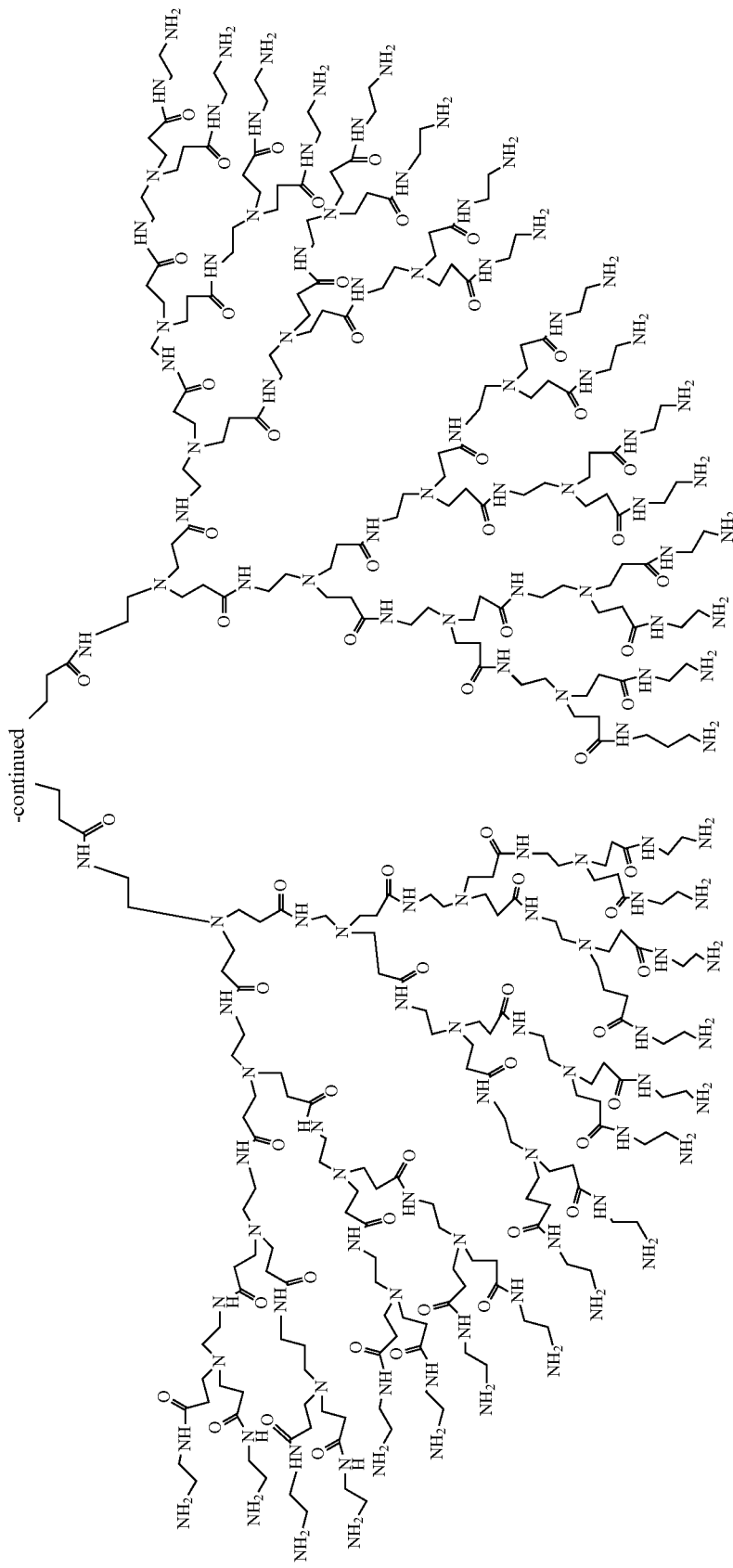

1.10 Composition 1.1, wherein the cationic polymer is a poly(ethyleneimine) polymer.

1.11 Composition 1.10, wherein the polyethyleneimine polymer has the following structure:

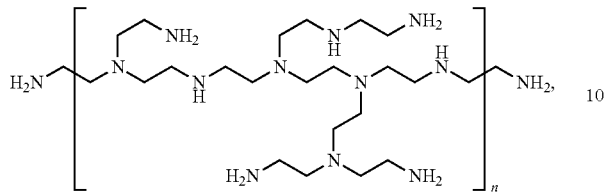

wherein n is an integer from 10 to 1000, e.g., 10 to 500, or 10 to 250, or 10 to 200, or 10 to 150, or 10 to 100, or 10 to 75, or 25 to 500, or 25 to 250, or 25 to 200, or 25 to 150, or 25 to 100, or 25 to 75, or about 50.

1.12 Composition 1, or any of 1.1-1.11, wherein the cationic polymer has a molecular weight of 1000 to 250,000; e.g., 1000 to 200,000, or 1000 to 150,000, or 1000 to 100,000, or 1000 to 75,000, or 1000 to 50,000, or 1000 to 25,000, or 1000 to 20,000, or 1000 to 15,000, or 1000 to 10,000, or 1000 to 7500, or 1000 to 5000, or 2000 to 20,000, or 2000 to 15,000, or 2000 to 10,000, or 2000 to 7500, or 2000 to 5000, or 4000 to 20,000, or 4000 to 15,000, or 4000 to 12,000, or 4000 to 10,000, or 4000 to 7500, or 5000 to 20,000, or 5000 to 15,000, or 5000 to 12,000, or 5000 to 7500, or 7000 to 20,000, or 7000 to 15,000, or 7000 to 12,000, or 7000 to 10,000, or 7000 to 9000, or 5000 to 500,000, or 5000 to 250,000, or 5000 to 200,000, or 5000 to 150,000, or 5000 to 100,000, or 5,000 to 75,000, or 5,000 to 50,000, or 10,000 to 250,000, or 10,000 to 200,000 or 10,000 to 150,000 or 10,000 to 100,000, or 10,000 to 75,000, or 10,000 to 50,000, 15,000 to 150,000, or 15,000 to 100,000, or 15,000 to 75,000, or 15,000 to 50,000, or 15,000 to 35,000, or 20,000 to 30,000, or about 25,000.

1.13 Composition 1, wherein the polyelectrolyte complex comprises a cationic polymer which is a polyamino acid comprising one or more basic amino acid residues (e.g., lysine, arginine, and/or histidine).

1.14 Composition 1.13, wherein the polyamino acid is a heteropolymer consisting only of neutral and basic amino acid residues (e.g., lysine, arginine, and/or histidine) (i.e., no acidic amino acid residues, e.g., glutamic acid, aspartic acid).

1.15 Composition 1.14, wherein the polyamino acid is a block copolymer, e.g., comprising blocks of basic amino acids (e.g., lysine, arginine, histidine) alternating with blocks of neutral amino acids (e.g., glycine, alanine, valine, leucine, isoleucine, serine, threonine, asparagine, glutamine, tyrosine);

1.16 Composition 1.13, wherein the polyamino acid is a homopolymer consisting of basic amino acid residues (e.g., lysine, arginine, and/or histidine).

1.17 Composition 1.16, wherein the polyamino acid is a polylysine homopolymer.

1.18 Composition 1.17, wherein the polylysine homopolymer is alpha-polylysine, optionally consisting of D-lysine residues (DLL) or L-lysine residues (PDL).

1.19 Composition 1.17, wherein the polylysine homopolymer is epsilon-polylysine, optionally consisting of D-lysine residues or L-lysine residues.

1.20 Any of Compositions 1.13-1.19, wherein the amino acids in the polyamino acid are all D-amino acids (e.g., D-lysine).

1.21 Any of Compositions 1.13-1.19, wherein the amino acids in the polyamino acid are all L-amino acids (e.g., L-lysine).

1.22 Any of Compositions 1.13-1.21, wherein the polyamino acid consists of 100 to 3000 amino acid residues, e.g., 100 to 2000, or 100 to 1500, or 100 to 1000, or 100 to 500, or 100 to 300, or 100 to 200, or 500 to 3000, or 500 to 2500, or 500 to 2000, or 500 to 1500 amino acid residues.

1.23 Any of Compositions 1.13-1.21, wherein the polyamino acid consists of 10 to 300 amino acid residues, e.g., 10 to 200, or 10 to 150, or 10 to 100, or 10 to 50, or 10 to 40, or 20 to 50, or 20 to 40, or 25 to 35 amino acid residues.

1.24 Any of Compositions 1.13-1.21, wherein the polyamino acid has a molecular weight of 10,000 to 1,000,000 Daltons, e.g., 10,000 to 500,000, or 10,000 to 300,000, or 20,000 to 500,000, or 20,000 to 300,000, or 30,000 to 500,000, or 30,000 to 300,000, or 30,000 to 250,000, or 30,000 to 200,000, or 30,000 to 150,000, or 30,000 to 100,000, or 30,000 to 50,000, or 50,000 to 500,000, or 50,000 to 300,000, or 100,000 to 500,000, or 100,000 to 300,000, or 150,000 to 500,000, or 150,000 to 300,000 Daltons.

1.25 Any of Compositions 1.13-1.21, wherein the polyamino acid has a molecular weight of 10,000 to 1,000,000 Daltons, e.g., 10,000 to 500,000, or 10,000 to 300,000, or 20,000 to 500,000, or 20,000 to 300,000, or 30,000 to 500,000, or 30,000 to 300,000, or 30,000 to 250,000, or 30,000 to 200,000, or 30,000 to 150,000, or 30,000 to 100,000, or 30,000 to 50,000, or 50,000 to 500,000, or 50,000 to 300,000, or 100,000 to 500,000, or 100,000 to 300,000, or 150,000 to 500,000, or 150,000 to 300,000 Daltons.

1.26 Any of Compositions 1.13-1.25, wherein the polyamino acid is a salt, e.g., a hydrochloride or hydrobromide salt.

1.27 Any of Compositions 1.13-1.25, wherein the polyamino acid is alpha-poly-D-lysine having a molecular weight of 150,000-300,000 Da, and/or 700-1500 D-lysine residues, optionally as a hydrobromide salt.

1.28 Any of Compositions 1.13-1.25, wherein the polyamino acid is alpha-poly-L-lysine having a molecular weight of 30,000-60,000 Da, and/or 30-60 L-lysine residues, optionally as a hydrochloride salt.

1.29 Any of Compositions 1.13-1.25, wherein the polyamino acid is epsilon-poly-L-lysine (ePL) having a molecular weight of 3000-5000, and/or 25-35 L-lysine residues, optionally in the form of a free base.

1.30 Composition 1 or any of 1.1-1.29, wherein the anionic polymer is a polyacrylic acid polymer or a polystyrene sulfonate polymer.

1.31 Composition 1 or any of 1.1-1.29, wherein the anionic carboxylate is an organic monocarboxylic, dicarboxylic, or tricarboxylic acid (e.g., acetic acid, lactic acid, glycolic acid, tartaric acid, malic acid, malonic acid, succinic acid, glutaric acid, maleic acid, fumaric acid, mandelic acid, or citric acid).

1.32 Composition 1.31, wherein the anionic carboxylate is a dicarboxylic acid, such as maleic acid or malic acid.

1.33 Composition 1.32, wherein the anionic carboxylate is malic acid;

1.34 Any one of Compositions 1.31-1.33, wherein the polyelectrolyte complex comprises a cationic polymer and an anionic carboxylate in a molar ratio sufficient to provide a charge neutral complex (i.e., equal amounts of cationic charged groups and anionic charged groups or a larger number of basic groups compared to acidic groups).

1.35 Composition 1.34, wherein the polyelectrolyte complex comprises a molar ratio of cationic polymer amino groups to anionic polymer or anionic carboxylate groups of 1:0.01 to 1:1, e.g., 1:0.01 to 1:0.9, or 1:0.01 to 1:0.75, or 1:0.01 to 1:0.5, or 1:0.01 to 1:0.45, or 1:0.01 to 1:0.4, or 1:0.05 to 1:0.9, or 1:0.05 to 1:0.75, or 1:0.05 to 1:0.5, or 1:0.05 to 1:0.45, or 1:0.05 to 1:0.4, or 1:0.1 to 1:0.9, or 1:0.1 to 1:0.75, or 1:0.1 to 1:0.5, or 1:0.1 to 1:0.45, or 1:0.1 to 1:0.4, or 1:0.1 to 1:0.3, or about 1:0.1, or about 1:0.03, or about 1:0.5.

1.36 Any one of Compositions 1.1-1.35, wherein the polyelectrolyte complex comprises a cationic polymer and an anionic carboxylate in a weight ratio of about 1:0.001 to 1:1, e.g., 1:0.001 to 1:0.7, or 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or 1:0.001 to 1:0.04, or 1:0.001 to 1:0.02, or 1:0.001 to 1:0.01, or 1:0.001 to 1:0.008, or 1:0.001 to 1:0.007, or 1:0.001 to 1:0.006, or about 1:0.003 to 1:0.015, or 1:0.004 to 1:0.013, or about 1:0.06, or about 1:0.03, or about 1:0.01, or about 1:0.006.

1.37 Any of Compositions 1.1-1.36, wherein the cationic polymer is PDL having a molecular weight of 150,000-300,000 Da, and/or 700-1500 D-lysine residues, optionally as a hydrobromide salt, and the anionic carboxylate is malic acid, and the weight ratio of the PDL to the malic acid is 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or about 1:0.06.

1.38 Any of Compositions 1.1-1.36, wherein the cationic polymer is PLL having a molecular weight of 30,000-60,000 Da, and/or 30-60 L-lysine residues, optionally as a hydrochloride salt, and the anionic carboxylate is malic acid, and the weight ratio of the PLL to the malic acid is 1:0.001 to 1:0.4, or 1:0.001 to 1:0.3, or 1:0.001 to 1:0.2, or 1:0.001 to 1:0.1, or 1:0.001 to 1:0.08, or 1:0.001 to 1:0.07, or 1:0.001 to 1:0.06, or about 1:0.06.

1.39 Any of Compositions 1.1-1.36, wherein the cationic polymer is ePL having a molecular weight of 3000-5000, and/or 25-35 L-lysine residues, optionally in the form of a free base, and the anionic carboxylate is malic acid, and the weight ratio of the ePL to the malic acid is 1:0.001 to 1:0.01, or 1:0.001 to 1:0.008, or 1:0.001 to 1:0.007, or 1:0.001 to 1:0.006, or about 1:0.003 to 1:0.015, or 1:0.004 to 1:0.013, or about 1:0.01, or about 1:0.006.

1.40 Composition 1 or any of 1.1-1.39, wherein the Composition does not comprise a soluble calcium ion source or a soluble phosphate ion source (e.g., a soluble calcium salt or a soluble orthophosphate or soluble metaphosphate salt, such as calcium chloride, calcium fluoride, calcium sulfate, calcium nitrate, sodium phosphates, potassium phosphates, sodium metaphosphates).

1.41 Composition 1 or any of 1.1-1.40, wherein the Composition is made by combining the polyelectrolyte complex with one or more other oral care ingredients and/or one or more orally acceptable solvents or vehicles, wherein all of said ingredients are combined in any permissible order.

1.42 Composition 1, or any of 1.1-1.40, wherein the Composition is made by combining the cationic polymer with the anionic polymer or anionic carboxylate, and with one or more other oral care ingredients and/or one or more orally acceptable solvents or vehicles, wherein all of said ingredients are combined in any permissible order.

1.43 Composition 1 or any of 1.1-1.42, wherein the Composition comprises the polyelectrolyte complex in an amount of 0.01% to 5%, or 0.05% to 5%, or 0.1% to 5%, or 0.5% to 3%, or 0.5% to 2.5%, or 0.5% to 2%, or 0.5% to 1.5%, or 0.75% to 1.25%, or 1% to 5%, or 1% to 4%, or 1% to 3% or 1% to 2%, or 1.5% to 3%, or 2% to 3%, or 1% to 2%, or 1% to 1.5%, or 1% to 1.25%, or 1% to 1.1%, by weight of the composition, optionally wherein said amount is calculated by combining the individual amounts of the cationic polymer and the anionic polymer or anionic carboxylate.

1.44 Composition 1 or any of 1.1-1.43, wherein the composition comprises an effective amount of the polyelectrolyte complex to modify the surface charge of the enamel of the teeth by adherence of the polyelectrolyte complex.

1.45 Any preceding composition wherein the composition further comprises one or more of a thickener (e.g., xanthan gum, hydroxyethyl cellulose, hydroxypropyl cellulose, hydroxypropyl methyl cellulose, or carboxymethyl cellulose, such as sodium salt), a buffer, a sweetener, a flavorant, a coloring agent (e.g., a pigment, a dye), an anti-caries agent, an anti-bacterial agent, an antioxidant, a whitening agent, a desensitizing agent, a preservative, a surfactant (e.g., cetylpyridinium chloride, sodium lauryl sulfate, poloxamer, cocamidopropyl betaine), a polymer (e.g., a mucoadhesive polymer or a rheological modifier, such as a PEG/PPG random copolymer or a PEG/PPG triblock copolymer such as a poloxamer), a fluoride source, an abrasive, a humectant (e.g., propylene glycol, glycerin, sorbitol, or any combination thereof), water, or any combination thereof.

1.46 Any preceding composition wherein the composition further comprises a fluoride ion source, e.g., selected from stannous fluoride, sodium fluoride, potassium fluoride, sodium monofluorophosphate, sodium fluorosilicate, ammonium fluorosilicate, amine fluoride (e.g., N'-octadecyltrimethylendiamine-N,N,N'-tris(2-ethanol)-dihydrofluoride), ammonium fluoride, titanium fluoride, hexafluorosulfate, or a mixture thereof.

1.47 Composition 1.46, wherein the fluoride ion source is present in an amount of 0.1 to 5% by weight of the composition, e.g., 0.5-1%, or 1-3%, or 2-3%, or 1-2%, or 2-4%, or 3-4%, or 2-5%, by weight of the composition.

1.48 Any preceding composition, further comprising one or more surfactants, e.g., anionic, cationic, nonionic, or zwitterionic surfactants.

1.49 Composition 1.48, wherein the one or more surfactants are selected from cetylpyridinium chloride, cocamidopropyl betaine, sodium lauryl sulfate, sodium lauryl ether sulfate, ammonium lauryl sulfate, cocomonoethanolamide, cocodiethanolamide, laurylamidopropyl dimethylamine oxide, myristylamidopropyl dimethylamine oxide, decyl glucoside, sodium N-cocoyl-N-methyl taurate, sodium cocoyl isethionate, sodium dioctyl sulfosuccinate).

1.50 Composition 1.498, wherein the each of the one or more surfactants is present in an amount of 0.01 to 5% by weight of the composition, e.g., 0.5-1%, or 1-3%, or 2-3%, or 1-2%, or 2-4%, or 3-4%, or 2-5%, or 0.01 to 3%, or 0.01 to 2%, or 0.01 to 1%, or 0.01 to 0.5%, by weight of the composition.

1.51 Any preceding composition, wherein the composition further comprises a desensitizing agent selected from potassium chloride, strontium chloride, or a mixture thereof.

1.52 Composition 1.51, wherein the desensitizing agent is present in an amount of 0.1 to 5% by weight of the composition, e.g., 0.5-1%, or 1-3%, or 2-3%, or 1-2%, or 2-4%, or 3-4%, or 2-5%, by weight of the composition.

1.53 Any preceding composition, wherein the composition further comprises a polyphosphate or an organic cyclic polyphosphate, such as an alkali metal pyrophosphate, an alkali metal tripolyphosphate, an alkali metal tetraphosphate, an alkali metal hexametaphosphate, an alkali metal insoluble metaphosphate, an alkali metal phytic acid salt, or a mixture thereof.

1.54 Composition 1.53, wherein the Composition comprises a sodium or potassium pyrophosphate, a sodium or potassium tripolyphosphate, a sodium or potassium tetraphosphate, a sodium or potassium phytic acid salt, or a mixture thereof;

1.55 Composition 1.54, wherein the Composition comprises tetrasodium or tetrapotassium pyrophosphate;

1.56 Composition 1.54, wherein the composition comprises sodium tripolyphosphate or potassium tripolyphosphate;

1.57 Any of Compositions 1.53-1.56, wherein each one or more polyphosphates is present in an amount of 0.1 to 5% by weight of the composition, e.g., 0.5-1%, or 1-3%, or 2-3%, or 1-2%, or 2-4%, or 3-4%, or 2-5%, by weight of the composition.

1.58 Any of compositions 1.53-1.56, wherein the composition comprises from 0.1 to 5% by weight of total polyphosphates, e.g., 0.5 to 5%, or 1% to 5%, or 2% to 5%, or 3 to 5%, or 3.5% to 5%, or 4% to 5%, or 3.5% to 4.5%, by weight of the composition.

1.59 Any preceding composition, wherein the composition further comprises an antioxidant, e.g., selected from butylated hydroxyanisole, butylated hydroxytoluene, vitamin A, carotenoids, vitamin E, flavonoids, polyphenols, ascorbic acid, and mixtures thereof;

1.60 Composition 1.59, wherein the composition comprises any one or more antioxidants in an individual amount of 0.001 to 1%, e.g., 0.01% to 0.5%, or 0.01 to 0.3%, or 0.01 to 0.1%, or 0.01 to 0.05%, or about 0.03%, by weight of the composition;

1.61 Any preceding composition, wherein the composition further comprises an abrasive, e.g., selected from silica, calcium pyrophosphate, insoluble sodium metaphosphate, calcium carbonate, calcium orthophosphate, dicalcium orthophosphate, tricalcium phosphate, and arginine carbonate, e.g., in an amount of 0.1 to 30%, or 1 to 20%, or 1 to 15%, or 1 to 10%, or 1 to 5%, or 10 to 30%, or 10 to 20%, by weight of the composition;

1.62 Any preceding composition, wherein the composition further comprises an enamel strengthening agent, e.g., in an amount from 0.1 to 5% by weight, such as zinc phosphate;

1.63 Any preceding composition, wherein the amount of the water is 10% by weight or more, relative to the weight of the oral care composition, for example, 10-90%, or 10-80%, or 10-70%, or 10-60%, or 10-50%, or 10-40%, or 10-30%, or 15-30%, or 20-30%, or about 25%, or about 30-95%, or about 40-95%, or about 50-95%, or about 60-95%, or about 70-95%, or about 80-95%, or about 90-95%, by weight of the composition.

1.64 Any preceding composition wherein the composition further comprises one or more polymeric rheological modifiers, for example, anionic polymers and/or neutral polymers.

1.65 Composition 1.64, wherein polymer is selected from one or more of the group consisting of polysaccharide gums (e.g., gellan gum, gum tragacanth, gum Arabic, sulfated carrageenan gums, alginic acid), synthetic anionic polymeric polycarboxylates (such as copolymers of maleic anhydride or acid with another polymerizable ethylenically unsaturated monomer, such as methyl vinyl ether (e.g., copolymers in a 1:4 to 4:1 ratio of maleic anhydride/acid to methyl vinyl ether)), polyacrylic acids or polyacrylates (e.g., carbomers), polyacrylamides, polyphosphonic acids, cross-linked carboxyvinyl copolymers, modified celluloses (e.g., methyl cellulose, hydroxyethyl cellulose, hydroxypropyl cellulose, hydroxypropyl methyl cellulose), polysaccharide gums (e.g., non-sulfated carrageenans, xanthan gum, guar gum) polyvinyl pyrrolidone, polyethylene glycols, chitosans, dextrans, hyaluronic acid, hyaluronic acid salts, polyoxyethylene-polyoxypropylene (PEG-PPG) tri-block copolymers (such as poloxamer 105, 108, 122, 123, 124, 182, 183, 184, 185, 188, 212, 215, 217, 234, 235, 237, 238, 288, 333, 334, 335, 338, 402, 403, or 407), PEG-PPG tetrablock copolymers, PEG/PPG random copolymers (such as PEG/PPG 116/66 or PEG/PPG-38/8), polyamines, polyvinyl alcohols, polyoxazolines (such as poly(2-alkyl-2-oxazolines, e.g., methyl, ethyl, or isopropyl substituted polyoxazolines), and polyvinylpyrrolidone-vinyl acetate copolymers (PVP-VA).

1.66 Compositions 1.64 or 1.65, wherein each of the one or more polymeric rheological modifiers is present in an amount of 0.1 to 30% by weight of the composition, e.g., 0.5-10%, 1-5%, 5-10%, 10-15%, 15-20%, 20-25%, 25-30%, 0.5-20%, 1-15%, 15-30%, 0.5-5%, 1-10%, 10-20%, 20-30%, 5-15%, 15-25%, 5-20%, 0.5-1%, or 15-30%, by weight of the composition.

1.67 Any preceding composition, further comprising one or more humectants, e.g., selected from sorbitol, glycerol, xylitol and propylene glycol, or combinations thereof, for example, a mixture of sorbitol, glycerol and propylene glycol.

1.68 Composition 1.66, wherein the composition comprises each of the one or more humectants in an amount of 1 to 30% by weight of the composition, e.g., 1-5%, 5-10%, 10-15%, 15-20%, 20-25%, 25-30%, 1-15%, 15-30%, 1-10%, 10-20%, 20-30%, 5-15%, 15-25%, 5-20%, or 15-30%, by weight of the composition.

1.69 Any preceding composition, wherein the oral care composition is a dentifrice (e.g., a toothpaste or oral gel), powder (e.g., tooth powder), cream, strip, gum (e.g., chewing gum), serum, mouth spray, or mouthwash.

1.70 Any preceding composition, wherein the pH of the composition is from 6 to 11, such as from 6 to 10, or 6 to 9, or 6 to 8, or 6 to 7, or 7 to 11, or 7 to 10.5, or 7 to 10, or 7 to 9, or 7 to 8, or 7.5 to 11, or 7.5 to 10.5, or 7.5 to 10, or 7.5 to 9, or 7.5 to 8, or 8.5 to 11, or 8.5 to 10.5, or 9 to 11, or 9.5 to 11.5, or 10 to 11, or 10 to 10.5, or about 6, or about 6.5, or about 7, or about 7.5, or about 8, or about 8.5 or about 10.5.

1.71 Composition 1.70, wherein the pH of the composition is adjusted by the addition of a suitable amount of a soluble basic compound, e.g., sodium hydroxide or potassium hydroxide.

1.72 Any preceding composition, wherein the composition is a single-phase and single-component composition (e.g., not a dual-phase composition).

1.73 Any preceding composition, wherein the composition is a dual-phase single-component composition (e.g., an emulsion or a mixture of non-miscible liquids).

1.74 Any preceding composition, wherein the composition is a dual-component composition.

1.75 Any preceding composition, wherein application of the composition to the teeth promotes an increase in enamel hardness;

1.76 Composition 1.75, wherein the increase in enamel hardness is an increase of at least 25 units on the Knoop Hardness scale ($kg_f/mm^2$), or at least 50 units, or at least 75 units, or at least 100 units; and/or wherein the enamel's Knoop hardness is increased to at least 150 units, or to at least 175 units, or to at least 200 units, or to at least 250 units, or to at least 300 units;

1.77 Any preceding composition, wherein application of the composition to the teeth promotes increased enamel surface smoothness (reduced roughness);

1.78 Composition 1.77, wherein the increased enamel smoothness is a reduction in roughness of at least 0.01 units (micrometers), or at least 0.02 units, or at least 0.04 units, or at least 0.06 units; and/or wherein the roughness is reduced to below 0.2 units, e.g., below 0.15, or below 0.1, or below 0.08, or below 0.06, or below 0.05 units roughness;

1.79 Any preceding composition, wherein application of the composition to the teeth promotes increased enamel surface glossiness;

1.80 Composition 1.79, wherein the increased glossiness is an increase in glossiness of at least 8 units (GU), or at least 10 units, or at least 15 units, or at least 20 units, or at least 30 units; and/or wherein the glossiness is increased to at least 65, or at least 70, or at least 75, or at least 80, or at least 85 units;

1.81 Any preceding composition, wherein application of the composition to the teeth promotes enamel damage repair;

1.82 Any of the preceding compositions, wherein the composition is effective upon application to the oral cavity, e.g., by rinsing or brushing, to (i) reduce or inhibit formation of dental caries, (ii) reduce, repair or inhibit pre-carious lesions of the enamel, e.g., as detected by quantitative light-induced fluorescence (QLF) or electrical caries measurement (ECM), (iii) reduce or inhibit demineralization and promote remineralization of the teeth, (iv) reduce hypersensitivity of the teeth, and/or (v) reduce or inhibit gingivitis.

1.83 Any of the preceding compositions, wherein the composition is effective upon application to the oral cavity, e.g., by rinsing or brushing, to increase tooth enamel hardness, increase tooth enamel smoothness, and/or increase tooth enamel glossiness.

Dendrimers are highly ordered, branched polymeric molecules.

PAMAM dendrimers are commonly made by a divergent synthesis method which involves the sequential "growth" of a dendrimer layer by layer, starting with a core "initiator" molecule which contains functional groups capable of acting as active sites in the initial reaction. Commonly, the core initiator molecule is amino compound, such as ammonia, ethylene diamine ($H_2NCH_2CH_2NH_2$), or diethylaminetriamine ($H_2NCH_2CH_2NHCH_2CH_2NH_2$), or triethylaminetetramine ($H_2NCH_2CH_2NHCH_2CH_2NHCH_2CH_2NH_2$). From this core molecule, a round of carboxylic ester terminated alkane chains is added, such as using methyl acrylate. These ester-terminated chains can then each be reacted in a nucleophilic displacement with a new amino alkane molecule, to continue the growth of the dendrimer. The dendrimer will therefore alternate between having amino-terminal groups and ester-terminal groups. Each subsequent reaction in the series increases the number of available surface groups exponentially. Thus, the outward growth of PAMAM dendrimers is accomplished by alternating between two reactions:

1. Michael addition of the amino-terminated surface onto methyl acrylate, resulting in an ester-terminated outer layer, and
2. Coupling with ethylene diamine to achieve a new amino-terminated surface.

Each round of reactions forms a new "generation", and PAMAM dendrimers are often classified by generation number; the common shorthand for this classification is "GX" or "GX PAMAM", where X is a number referring to the generation number. The first full cycle of Michael addition followed by coupling with ethylene diamine forms Generation 0 PAMAM, with subsequent Michael additions giving rise to "half" generations, and subsequent amide coupling giving rise to "full" (integer) generations. Optionally, after the final round of dendrimer growth, the terminal reactive groups (amines or carboxylate esters) may be capped with some other moiety. PAMAM dendrimers typically adopt a spheroid or globular shape when the Generation number is 4 or higher.

Newer methods of dendrimer synthesis rely on convergent methods utilizing orthogonal protecting groups.

In another aspect, the present disclosure provides a method of treatment or prevention of dental caries, enamel erosion, early erosive damage, and/or enamel demineralization (including preventing pre-carious lesions from forming or progressing to caries), the method comprising the application to the oral cavity of a person in need thereof a polyelectrolyte complex according to the disclosure (e.g., Complex 1 et seq.) or composition according to the disclosure (e.g., Composition 1 et seq.), e.g., by rinsing or brushing, for example, one or more times per day. In some embodiments, the method may also reduce hypersensitivity of the teeth, and/or reduce or inhibit gingivitis. Preferably, the method provides an increase in enamel hardness, enamel smoothness, and/or enamel glossiness.

In another aspect, the present disclosure provides a method for repairing enamel and/or remineralizing enamel (e.g., reducing or repairing pre-carious lesions of the enamel), the method comprising the application to the oral cavity of a person in need thereof a polyelectrolyte complex according to the disclosure (e.g., Complex 1 et seq.) or composition according to the disclosure (e.g., Composition 1 et seq.), e.g., by rinsing or brushing, for example, one or more times per day. In some embodiments, the method may also reduce hypersensitivity of the teeth, and/or reduce or inhibit gingivitis. Preferably, the method provides an increase in enamel hardness, enamel smoothness, and/or enamel glossiness.

The methods comprise applying any of the compositions as described herein to the teeth, e.g., by brushing, spraying, rinsing, painting (e.g., with a brush or applicator) or otherwise administering the compositions to the oral cavity (e.g., the teeth) of a subject in need thereof. The compositions can be administered regularly, such as, for example, one or more times per day. In various embodiments, administering the compositions of the present disclosure to a patient can provide one or more of the following benefits: (i) reduce or inhibit formation of dental caries, (ii) reduce, repair or inhibit pre-carious lesions of the enamel, e.g., as detected by quantitative light-induced fluorescence (QLF) or electrical caries measurement (ECM), (iii) reduce or inhibit demineralization and promote remineralization of the teeth, (iv) reduce hypersensitivity of the teeth, or (v) reduce or inhibit gingivitis. Preferably, the method provides an increase in enamel hardness, enamel smoothness, and/or enamel glossiness.

The disclosure further provides a polyelectrolyte complex according to the disclosure (e.g., Complex 1 et seq.) or a composition according to the disclosure (e.g., Composition 1 et seq.), for use in any of the above methods.

The compositions may optionally comprise additional ingredients suitable for use in oral care compositions. Examples of such ingredients include active agents, such as a fluoride source and/or a phosphate source. The compositions may be formulated in a suitable dentifrice base, e.g., comprising abrasives, e.g., silica abrasives, surfactants, foaming agents, vitamins, polymers, enzymes, humectants, thickeners, additional antimicrobial agents, preservatives, flavorings, colorings, and/or combinations thereof. Examples of suitable dentifrice bases are known in the art. Alternatively, the compositions may be formulated as a gel (e.g., for use in a tray), chewing gum, lozenge or mint. Examples of suitable additional ingredients that can be employed in the compositions of the present disclosure are discussed in more detail below.

Anionic Polymer: The compositions of the disclosure may include an anionic polymer, for example, in an amount of from 1 to 20%, e.g., from 5 to 20%, or from 8 to 15%, or from 10 to 14%, or from 11 to 13%, or about 12%. Suitable anionic polymers include synthetic anionic polymeric polycarboxylates, polyacrylic acids and polyacrylates, polyphosphonic acids, and cross-linked carboxyvinyl copolymers. Examples of synthetic anionic polymeric polycarboxylates include 1:4 to 4:1 copolymers of maleic anhydride or acid with another polymerizable ethylenically unsaturated monomer, preferably methyl vinyl ether/maleic anhydride or acid having a molecular weight (M.W.) of from 30,000 to 1,000,000, such as from 300,000 to 800,000. These copolymers are available for example as Gantrez, e.g., AN 139 (M.W. 500,000), AN 119 (M.W. 250,000) and preferably S-97 Pharmaceutical Grade (M.W. 700,000) available from ISP Technologies, Inc., Bound Brook, N.J. 08805. Other suitable polymers include those such as the 1:1 copolymers of maleic anhydride with ethyl acrylate, hydroxyethyl methacrylate, N-vinyl-2-pyrollidone, or ethylene, the latter being available for example as Monsanto EMA No. 1103, M.W. 10,000 and EMA Grade 61, and 1:1 copolymers of acrylic acid with methyl or hydroxyethyl methacrylate, methyl or ethyl acrylate, isobutyl vinyl ether or N-vinyl-2-pyrrolidone. Suitable generally, are polymerized olefinically or ethylenically unsaturated carboxylic acids containing an activated carbon-to-carbon olefinic double bond and at least one carboxyl group, that is, an acid containing an olefinic double bond which readily functions in polymerization because of its presence in the monomer molecule either in the alpha-beta position with respect to a carboxyl group or as part of a terminal methylene grouping. Illustrative of such acids are acrylic, methacrylic, ethacrylic, alpha-chloroacrylic, crotonic, beta-acryloxy propionic, sorbic, alpha-chlorsorbic, cinnamic, beta-styrylacrylic, muconic, itaconic, citraconic, mesaconic, glutaconic, aconitic, alpha-phenylacrylic, 2-benzyl acrylic, 2-cyclohexylacrylic, angelic, umbellic, fumaric, maleic acids and anhydrides. Other different olefinic monomers copolymerizable with such carboxylic monomers include vinyl acetate, vinyl chloride, dimethyl maleate and the like. Copolymers contain sufficient carboxylic salt groups for water-solubility. A further class of polymeric agents includes a composition containing homopolymers of substituted acrylamides and/or homopolymers of unsaturated sulfonic acids and salts thereof, in particular where polymers are based on unsaturated sulfonic acids selected from acrylamidoalkyne sulfonic acids such as 2-acrylamide 2 methylpropane sulfonic acid having a molecular weight of from 1,000 to 2,000,000.

Active Agents: The compositions of the disclosure may comprise various other agents that are active to protect and enhance the strength and integrity of the enamel and tooth structure and/or to reduce bacteria and associated tooth decay and/or gum disease or to provide other desired benefits. Effective concentration of the active ingredients used herein will depend on the particular agent and the delivery system used. The concentration will also depend on the exact salt or polymer selected. For example, where the active agent is provided in salt form, the counterion will affect the weight of the salt, so that if the counterion is heavier, more salt by weight will be required to provide the same concentration of active ion in the final product.

Compositions of the disclosure may contain from 0.1 to 1 wt. % of an antibacterial agent, such as about 0.3 wt. %. Any suitable antimicrobial actives can be employed.

Fluoride Ion Source: The oral care compositions can include one or more fluoride ion sources, e.g., soluble fluoride salts. A wide variety of fluoride ion-yielding materials can be employed as sources of soluble fluoride in the present compositions. Examples of suitable fluoride ion-yielding materials are found in U.S. Pat. No. 3,535,421, to Briner et al.; U.S. Pat. No. 4,885,155, to Parran, Jr. et al. and U.S. Pat. No. 3,678,154, to Widder et al, the disclosure of each of which is hereby incorporated by reference in their entirety. Representative fluoride ion sources include, but are not limited to, stannous fluoride, sodium fluoride, potassium fluoride, sodium monofluorophosphate, sodium fluorosilicate, ammonium fluorosilicate, amine fluoride, ammonium fluoride, and combinations thereof. In certain embodiments the fluoride ion source includes sodium fluoride, sodium monofluorophosphate as well as mixtures thereof. In certain embodiments, the oral care composition of the disclosure may contain stannous fluoride and any additional source of fluoride ions or fluorine-providing agents in amounts sufficient to supply, in total, from 25 ppm to 25,000 ppm (mass fraction) of fluoride ions, generally at least 500 ppm, e.g., from 500 to 2000 ppm, e.g., from 1000 to 1600 ppm, e.g., about 1450 ppm. The appropriate level of fluoride will depend on the particular application. A toothpaste for general consumer use would typically have from 1000 to about 1500 ppm, with pediatric toothpaste having somewhat less. A dentifrice or coating for professional application could have as much as 5,000 or even about 25,000 ppm fluoride. Additional fluoride ion sources may be added to the compositions of the disclosure at a level of from 0.01 wt. % to 10 wt. % in one embodiment or from 0.03 wt. % to 5 wt. %, and in another embodiment from 0.1 wt. % to 1 wt. % by weight of the composition. As discussed above, weights of fluoride salts to provide the appropriate level of fluoride ion will vary based on the weight of the counterion in the salt.

Abrasives: The compositions of the disclosure can include abrasives. Examples of suitable abrasives include silica abrasives, such as standard cleaning silicas, high cleaning silicas or any other suitable abrasive silicas. Additional examples of abrasives that can be used in addition to or in place of the silica abrasives include, for example, a calcium phosphate abrasive, e.g., tricalcium phosphate ($Ca_3(PO_4)_2$), hydroxyapatite ($Ca_{10}(PO_4)_6(OH)_2$), or dicalcium phosphate dihydrate ($CaHPO_4 \cdot 2H_2O$, also sometimes referred to herein as DiCal) or calcium pyrophosphate; calcium carbonate abrasive; or abrasives such as sodium metaphosphate, potassium metaphosphate, aluminum silicate, calcined alumina, bentonite or other siliceous materials, or combinations thereof.

Silica abrasive polishing materials useful herein, as well as the other abrasives, generally have an average particle size ranging between 0.1 and 30 microns, such as between 5 and 15 microns. The silica abrasives can be from precipitated silica or silica gels, such as the silica xerogels described in U.S. Pat. No. 3,538,230, to Pader et al. and U.S. Pat. No. 3,862,307, to Digiulio, the disclosures of which are incorporated herein by reference in their entireties. Particular silica xerogels are marketed under the trade name Syloid® by the W. R. Grace & Co., Davison Chemical Division. The precipitated silica materials include those marketed by the J. M. Huber Corp. under the trade name Zeodent®, including the silica carrying the designation Zeodent 115 and 119. These silica abrasives are described in U.S. Pat. No. 4,340,583, to Wason, the disclosure of which is incorporated herein by reference in its entirety. In certain embodiments, abrasive materials useful in the practice of the oral care compositions in accordance with the disclosure include silica gels and precipitated amorphous silica having an oil absorption value of less than 100 cc/100 g silica, such as from 45 cc/100 g to 70 cc/100 g silica. Oil absorption values are measured using the ASTA Rub-Out Method D281. In certain embodiments, the silicas are colloidal particles having an average particle size of from 3 microns to 12 microns, and from 5 to 10 microns. Examples of low oil absorption silica abrasives useful in the practice of the disclosure are marketed under the trade designation Sylodent XWA® by Davison Chemical Division of W.R. Grace & Co., Baltimore, Md. 21203. Sylodent 650 XWA®, a silica hydrogel composed of particles of colloidal silica having a water content of 29% by weight averaging from 7 to 10 microns in diameter, and an oil absorption of less than 70 cc/100 g of silica is an example of a low oil absorption silica abrasive useful in the practice of the present disclosure.

Any suitable amount of silica abrasive can be employed. Examples of suitable amounts include 10 wt. % or more dry weight of silica particles, such as from 15 wt. % to 30 wt. % or from 15 wt. % to 25 wt. %, based on the total weight of the composition.

Foaming agents: The oral care compositions of the disclosure also may include an agent to increase the amount of foam that is produced when the oral cavity is brushed. Illustrative examples of agents that increase the amount of foam include, but are not limited to polyoxyethylene and certain polymers including, but not limited to, alginate polymers. The polyoxyethylene may increase the amount of foam and the thickness of the foam generated by the oral care compositions of the present disclosure. Polyoxyethylene is also commonly known as polyethylene glycol ("PEG") or polyethylene oxide. The polyoxyethylenes suitable for compositions of the present disclosure may have a molecular weight of from 200,000 to 7,000,000. In one embodiment the molecular weight may be from 600,000 to 2,000,000 and in another embodiment from 800,000 to 1,000,000. Polyox® is the trade name for the high molecular weight polyoxyethylene produced by Union Carbide. The foaming agent, (e.g., polyoxyethylene) may be present in an amount of from 0.1% to 50%, in one embodiment from 0.5% to 20% and in another embodiment from 1% to 10%, or from 2% to 5% by weight of the oral care compositions of the present disclosure.

Surfactants: The compositions useful in the compositions of the present disclosure may contain anionic surfactants, for example:

i. water-soluble salts of higher fatty acid monoglyceride monosulfates, such as the sodium salt of the monosulfated monoglyceride of hydrogenated coconut oil fatty acids such as sodium N-methyl N-cocoyl taurate, sodium cocomonoglyceride sulfate, ii. higher alkyl sulfates, such as sodium lauryl sulfate, iii. higher alkyl-ether sulfates, e.g., of formula $CH_3(CH_2)_mCH_2(OCH_2CH_2)_nOSO_3X$, wherein m is 6-16, e.g., 10, n is 1-6, e.g., 2, 3 or 4, and X is Na or K, for example sodium laureth-2 sulfate ($CH_3(CH_2)_{10}CH_2(OCH_2CH_2)_2OSO_3Na$), iv. higher alkyl aryl sulfonates such as sodium dodecyl benzene sulfonate (sodium lauryl benzene sulfonate), v. higher alkyl sulfoacetates, such as sodium lauryl sulfoacetate (dodecyl sodium sulfoacetate), higher fatty acid esters of 1,2 dihydroxy propane sulfonate, sulfocolaurate (N-2-ethyl laurate potassium sulfoacetamide) and sodium lauryl sarcosinate.

By "higher alkyl" is meant, e.g., $C_{6-30}$ alkyl. In certain embodiments, the anionic surfactants useful herein include the water-soluble salts of alkyl sulfates having from 10 to 18 carbon atoms in the alkyl radical and the water-soluble salts of sulfonated monoglycerides of fatty acids having from 10 to 18 carbon atoms. Sodium lauryl sulfate, sodium lauroyl sarcosinate and sodium coconut monoglyceride sulfonates are examples of anionic surfactants of this type. In particular embodiments, the anionic surfactant is selected from sodium lauryl sulfate and sodium ether lauryl sulfate. In a particular embodiment, the compositions of the disclosure comprise sodium lauryl sulfate. The anionic surfactant may be present in an amount which is effective, e.g., >0.01% by weight of the formulation, but not at a concentration which would be irritating to the oral tissue, e.g., <10%, and optimal concentrations depend on the particular formulation and the particular surfactant. In one embodiment, the anionic surfactant is present in a toothpaste at from 0.3% to 4.5% by weight, e.g., about 1.5%. The compositions of the disclosure may optionally contain mixtures of surfactants, e.g., comprising anionic surfactants and other surfactants that may be anionic, cationic, zwitterionic or nonionic. Generally, suitable surfactants are those which are reasonably stable throughout a wide pH range. Surfactants are described more fully, for example, in U.S. Pat. No. 3,959,458, to Agricola et al.; U.S. Pat. No. 3,937,807, to Haefele; and U.S. Pat. No. 4,051,234, to Gieske et al, the disclosures of which are incorporated herein by reference in their entireties.

The surfactant or mixtures of compatible surfactants that are included in addition to the anionic surfactants can be present in the compositions of the present disclosure in from 0.1% to 5.0%, in another embodiment from 0.3% to 3.0% and in another embodiment from 0.5% to 2.0% by weight of the total composition. These ranges do not include the anionic surfactant amounts.

In some embodiments, the compositions of the present disclosure include a zwitterionic surfactant, for example a betaine surfactant, for example cocamidopropyl betaine, e.g., in an amount of from 0.1% to 4.5% by weight, e.g., from 0.5 to 2% by weight cocamidopropyl betaine.

Tartar control agents: In various embodiments of the present disclosure, the compositions comprise an anti-calculus (tartar control) agent. Suitable anti-calculus agents include, without limitation, phosphates and polyphosphates (for example pyrophosphates and tripolyphosphates), polyaminopropanesulfonic acid (AMPS), hexametaphosphate salts, zinc citrate trihydrate, polypeptides, polyolefin sulfonates, polyolefin phosphates, and diphosphonates. The compositions of the disclosure thus may comprise phosphate salts in addition to the zinc phosphate. In particular embodiments, these salts are alkali phosphate salts, e.g., salts of alkali metal hydroxides or alkaline earth hydroxides, for example, sodium, potassium or calcium salts. "Phosphate" as used herein encompasses orally acceptable mono- and polyphosphates, for example, $P_{1-6}$ phosphates, for example monomeric phosphates such as monobasic, dibasic or tribasic phosphate; and dimeric phosphates such as pyrophosphates; and multimeric phosphates, such as tripolyphosphates, tetraphosphates, hexaphosphates and hexametaphosphates (e.g., sodium hexametaphosphate). In particular examples, the selected phosphate is selected from alkali dibasic phosphate and alkali pyrophosphate salts, e.g., selected from sodium phosphate dibasic, potassium phosphate dibasic, dicalcium phosphate dihydrate, calcium pyrophosphate, tetrasodium pyrophosphate, tetrapotassium pyrophosphate, sodium tripolyphosphate, and mixtures of any of two or more of these. In a particular embodiment, for example the compositions may comprise tetrasodium pyrophosphate in an amount of from 0.5 to 5% by weight, e.g., 1-3%, or 1-2% or about 2% by weight of the composition. In another embodiment, the compositions may comprise a mixture of tetrasodium pyrophosphate (TSPP) and sodium tripolyphosphate (STPP), e.g., in proportions of TSPP at from 0.5 to 5 wt. %, such as from 1 to 2 wt. % and STPP at from 0.5% to 6 wt. %, such as 1 to 4%, or 2 to 3% by weight of the composition. Such phosphates are provided in an amount effective to aid in cleaning the teeth, and/or to reduce tartar buildup on the teeth, for example in an amount of from 0.2 to 20 wt. %, e.g., from 1 to 15 wt. %, by weight of the composition.

Flavoring Agents: The oral care compositions of the disclosure may also include a flavoring agent. Flavoring agents which are used in the practice of the present disclosure include, but are not limited to, essential oils as well as various flavoring aldehydes, esters, alcohols, and similar materials. Examples of the essential oils include oils of spearmint, peppermint, wintergreen, sassafras, clove, sage, eucalyptus, marjoram, cinnamon, lemon, lime, grapefruit, and orange. Also useful are such chemicals as menthol, carvone, and anethole. Certain embodiments employ the oils of peppermint and spearmint. The flavoring agent may be incorporated in the oral composition at a concentration of from 0.1 to 5% by weight e.g., from 0.5 to 1.5% by weight.

Other Polymers: The oral care compositions of the disclosure may also include additional polymers to adjust the viscosity of the formulation or enhance the solubility of other ingredients. Such additional polymers include polyethylene glycols, polysaccharides (e.g., cellulose derivatives, for example carboxymethyl cellulose, hydroxymethyl cellulose, ethyl cellulose, microcrystalline cellulose or polysaccharide gums, for example xanthan gum, guar gum or carrageenan gum). Acidic polymers, for example polyacrylate gels, may be provided in the form of their free acids or partially or fully neutralized water-soluble alkali metal (e.g., potassium and sodium) or ammonium salts. In one embodiment, the oral care composition may contain PVP. PVP generally refers to a polymer containing vinylpyrrolidone (also referred to as N-vinylpyrrolidone, N-vinyl-2-pyrrolidione and N-vinyl-2-pyrrolidinone) as a monomeric unit. The monomeric unit consists of a polar imide group, four non-polar methylene groups and a non-polar methane group.

In some embodiments, the compositions of the disclosure comprise one or more polyethylene glycols, for example, polyethylene glycols in a molecular weight range from 200 to 800. For example, the compositions may comprise one or more of polyethylene glycol 200, polyethylene glycol 300, polyethylene glycol 400, polyethylene glycol, 600 or polyethylene glycol 800.

Silica thickeners, which form polymeric structures or gels in aqueous media, may be present. Note that these silica thickeners are physically and functionally distinct from the particulate silica abrasives also present in the compositions, as the silica thickeners are very finely divided and provide little or no abrasive action. Other thickening agents are carboxyvinyl polymers, carrageenan, hydroxyethyl cellulose and water-soluble salts of cellulose ethers such as sodium carboxymethyl cellulose and sodium carboxymethyl hydroxyethyl cellulose. Natural gums such as karaya, gum arabic, and gum tragacanth can also be incorporated. Colloidal magnesium aluminum silicate can also be used as a component of the thickening composition to further improve the composition's texture. In certain embodiments, thickening agents in an amount of from 0.5% to 5.0% by weight of the total composition are used.

Humectants: Within certain embodiments of the oral compositions, it is also desirable to incorporate a humectant to prevent the composition from hardening upon exposure to air. Certain humectants can also impart desirable sweetness or flavor to dentifrice compositions. Suitable humectants include edible polyhydric alcohols such as glycerin, sorbitol, xylitol, propylene glycol as well as other polyols and mixtures of these humectants. In one embodiment of the disclosure, the principal humectant is one of glycerin, sorbitol or a combination thereof. The humectant may be present at levels of greater than 15 wt. %, such as from 15 wt. % to 55 wt. %, or from 20 wt. % to 50 wt. %, or from 20 wt. % to 40 wt. %, or about 20% or about 30% or about 40%, based on the total weight of the composition.

Other optional ingredients: In addition to the above-described components, the embodiments of this disclosure can contain a variety of optional oral care ingredients some of which are described below. Optional ingredients include, for example, but are not limited to, adhesives, sudsing agents, flavoring agents, sweetening agents such as sodium saccharin, additional antiplaque agents, abrasives, aesthetics such as $TiO_2$ coated mica or other coloring agents, such as dyes and/or pigments.

In some embodiments, the oral care compositions of the present disclosure are either essentially free of, free of, or do not include any sodium hexametaphosphate. In some embodiments, the oral care compositions of the present disclosure are either essentially free of, free of, or do not include any halogenated diphenyl ethers (e.g., triclosan).

As used herein, the term "essentially free" means that the compositions have no more than 0.01% by weight of these compounds.

The amount of water and of any additional ingredients employed in these methods may be any of the amounts and ingredients recited herein for the compositions of the present disclosure. Any standard mixing techniques can be employed to combine the ingredients.

With reference to any polymers disclosed herein, the term "molecular weight" may refer to either number-average molecular weight or weight-average molecular weight. The skilled artisan will recognize that both number-average and weight-average molecular weights are commonly used to characterize polymers, the difference depending on the method used for the measurement. For example, number-average molecular weight can be determined using gel permeation chromatography, viscometry, and colligative methods such as vapor pressure osmometry, while weight-average molecular weight can be determined using light or X-ray scattering, and sedimentation velocity. Weight average molecular weight is always greater than or equal to number average molecular weight because larger molecules in a sample necessarily weigh more than smaller molecules. For most commercially available polymers, especially where the average molecular weight is characterized by a range, the difference between using number-average or weight-average molecular weights is inconsequential.

EXAMPLES

Example 1—Bovine Enamel Repair

Polyelectrolyte complex solutions are prepared by mixing PAMAM solution with malic acid solution in appropriate ratios to provide the following formulas (solution A has cationic polymer without an anionic counterpart):

| Sample | A | B | C | D | E |
|---|---|---|---|---|---|
| PAMAM | 1 mg/mL | 1 mg/mL | 1 mg/mL | 1 mg/mL | 1 mg/mL |
| Malic acid | 0 mg/mL | 0.06 mg/mL | 0.18 mg/mL | 0.3 mg/mL | 0.6 mg/mL |
| PAMAM/ MA weight ratio | 1:0 | 1:0.06 | 1:0.18 | 1:0.3 | 1:0.6 |
| Terminal amino/carboxy molar ratio | 1:0 | 1:0.1 | 1:0.3 | 1:0.5 | 1:1 |
| pH | 9.3 | 8.6 | 7.2 | 7.1 | 6.9 |

The PAMAM dendrimer used in the study as the following structure:

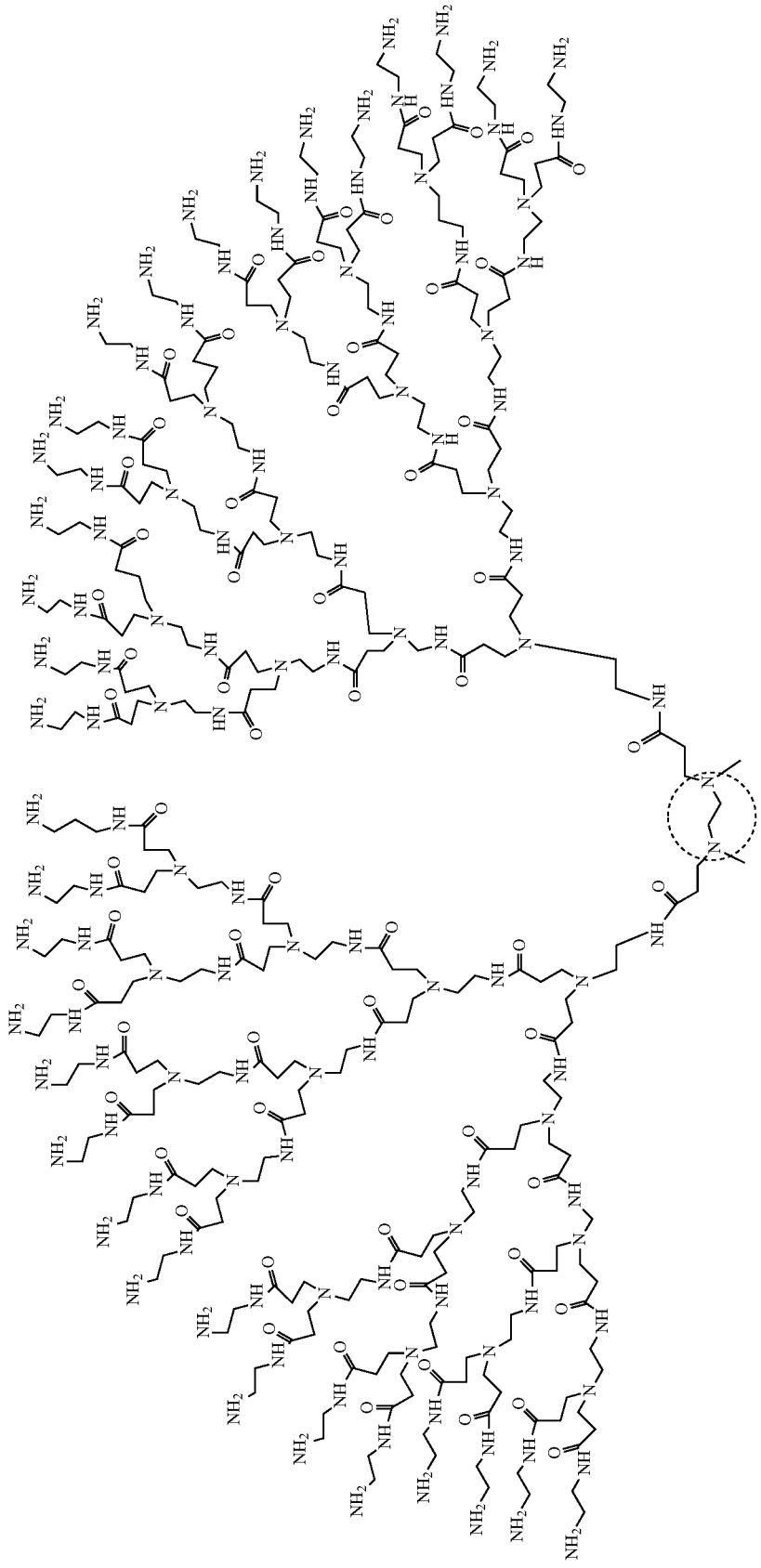

-continued
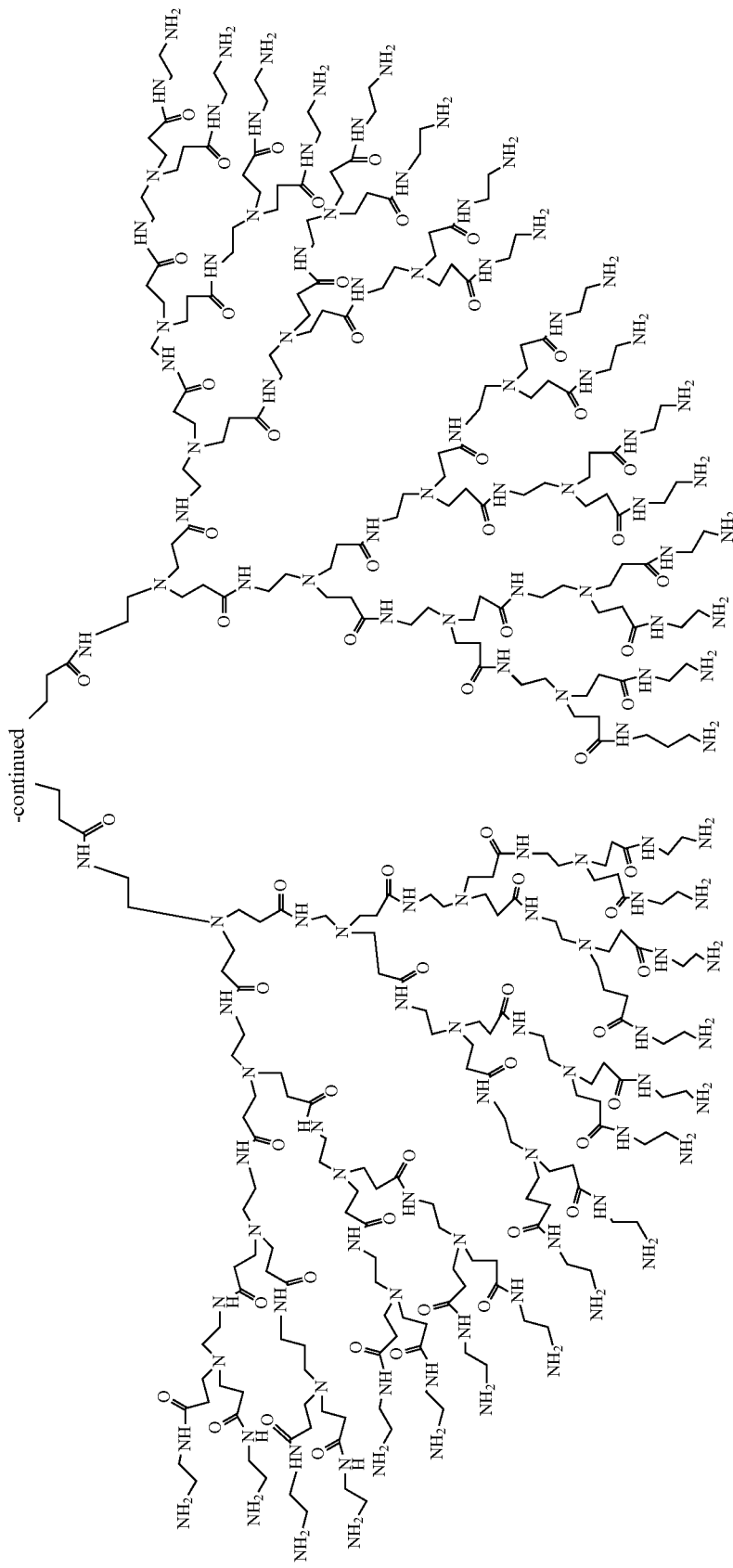

As shown above, the dendrimer has a surface composed of primary amino groups (part of ethylamine chains), while the interior of the dendrimer comprises amide groups and tertiary amino groups.

Polyelectrolyte complex solutions are prepared by mixing PEI solution with malic acid solution in appropriate ratios to provide the following formulas (solution F has cationic polymer without an anionic counterpart):

| Sample | F | G | H | I | J |
|---|---|---|---|---|---|
| PEI (MW 25,000 Da) | 4.8 mg/mL | 4.8 mg/mL | 4.8 mg/mL | 4.8 mg/mL | 4.8 mg/mL |
| Malic acid | 0 mg/mL | 0.06 mg/mL | 0.18 mg/mL | 0.3 mg/mL | 0.6 mg/mL |
| PAMAM/ MA weight ratio | 4.8:0 | 4.8:0.06 | 4.8:0.18 | 4.8:0.3 | 4.8:0.6 |
| Terminal amino/carboxy molar ratio | 1:0 | 1:0.1 | 1:0.3 | 1:0.5 | 1:1 |
| pH | 10.8 | 10.5 | 10.1 | 9.9 | 9.5 |

The PEI polymer used in the study has the following stricture, having values of n to provide an average molecular weight of about 25,000 Daltons (e.g., n about 40-60, or about 50-55 on average):

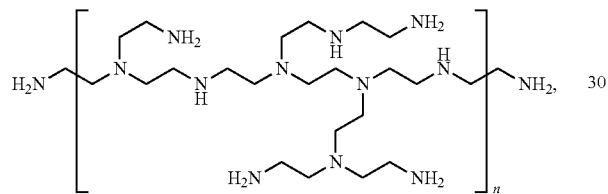

Test results are compared to 0.15% w/v sodium fluoride solution (pH 7.2) and deionized water (pH 6.6).

Bovine enamel blocks are obtained from sound bovine incisors without defects. The labial surface of the bovine teeth is cut to provide enamel specimens of about 3×3×2 mm in size. The enamel layer is about 1 mm thick and the dentin left in the specimen is about 1 mm thick.

Etched enamel samples are prepared by treatment with 1% aqueous citric acid (pH 3.6) for 10 minutes, followed by rinsing with deionized water.

Etched bovine enamel samples are treated with 50 microliters of polyelectrolyte solutions A-F, or with sodium fluoride solution or water, for ten minutes at room temperature. The samples are then rinsed with deionized water and then they are immersed in 50 mL of Remineralization Solution (0.2205 g/L $CaCl_2 \cdot 2H_2O$, 0.1225 g/L $KH_2PO_4$, 9.6915 g/L KCl and 4.766 g/L HEPEs buffer, pH adjusted to 7 with NaOH) overnight at 37° C. The enamel samples are then rinsed with deionized water for 50 seconds and then air dried.

Knoop Hardness (KHN) is a measure of hardness of a material calculated by measuring the indentation produced by a diamond tip that is pressed onto the surface of a sample. Using a calibrated microscope, the area of the impression can be determined, and from the area of the indentation (D) in square millimeters, and the applied load (F) in kilograms force, the Knoop Hardness is calculated as: $KHN = 14.229 (F/D^2)$. Knoop hardness has units of $kg_f/mm^2$.

KHN is determined using the Knoop microhardness tester. A baseline measurement is taken on a sound enamel sample without treatment ($KHN_0$), on an acid-etched enamel sample ($KHN_e$), and on an acid-etched enamel sample after treatment ($KHN_t$). Each KHN measurement is the average of 5 indentations made on the same specimen at a force of 0.05 kg for 15 seconds. A value for Percentage of Hardness Repair (% HR) is calculated according to the following formula:

$$\% \, HR = (KHN_t - KHN_e)/(KHN_0 - KHN_e) \times 100$$

The results are shown in the table below:

| Sample | A | B | C | D | E | F | G | H | I | J | NaF | $H_2O$ |
|---|---|---|---|---|---|---|---|---|---|---|---|---|
| % HR | 46.6 | 72.2 | 68.0 | 49.8 | 24.5 | 33.1 | 70.7 | 67.6 | 25.1 | 8.0 | 27.9 | 13.1 |

The results demonstrate that all sample solutions other than sample J provide better enamel repair than the deionized water negative control. In addition, sample solutions A, B, C, D, F, G, and H provide better enamel repair than the sodium fluoride solution positive control. However, it is particularly unexpected that the polyelectrolyte complexes of samples B, C, D, G, and H provide substantially better enamel repair compared to corresponding anion-free samples A and F. Thus, while improved enamel repair, compared to sodium fluoride, results even from a solution having only a PAMAM dendrimer or PEI cationic polymer, the results are substantially improved by the formation of a polyelectrolyte complex between the cationic polymer and an anionic counterion. However, it is also shown that when the amino-to-carboxy ratios between the cationic polymer and the anionic carboxylate approaches 1:1, the enamel repair activity is significantly reduced. The best results are obtained at amino-to-carboxy ratios of 1:0.1 and 1:0.3.

Example 2—Human Enamel Repair

Additional polyelectrolyte complex solutions and control solutions are prepared by mixing PAMAM or PEI solutions with malic acid solution, and/or a solution of calcium chloride and dibasic sodium phosphate, in appropriate ratios to provide the following formulas:

| Sample | K | L | M | N | O | P |
|---|---|---|---|---|---|---|
| PAM AM (mg/mL) | 1.0 | 1.0 | 1.0 | 0 | 0 | 0 |
| PEI (mg/mL) | 0 | 0 | 0 | 4.8 | 4.8 | 4.8 |
| Malic acid (mg/mL) | 0 | 0.06 | 0.06 | 0 | 0.06 | 0.06 |
| Calcium (mM) | 0 | 0 | 25 | 0 | 0 | 25 |
| Phosphorus (mM) | 0 | 0 | 15 | 0 | 0 | 15 |
| pH | 9.8 | 8.6 | 8.2 | 10.7 | 10.5 | 10.2 |

Samples M and P have a final concentration of about 0.28 mg/mL calcium chloride and about 0.21 mg/mL sodium phosphate dibasic. Samples L, M, O, and P each include both a cationic polymer (PAMAM or PEI) and malic acid at the preferred amino-to-carboxy ratio of 1:0.1 obtained in Example 1.

For comparative purposes, HAP gel (4 wt. % hydroxyethyl cellulose and 5 wt. % hydroxyapatite in water, pH 6.5), malic acid solution (0.06 mg/mL, pH 3.9), and deionized water (pH 6.75).

Human molar teeth are obtained, and the root portion of the molar is removed. The crown of the molar is cut longitudinally into slices 2 mm thick using a water-cooled low-speed diamond saw. The human enamel samples are then mounted in acrylic resin. The embedded samples are grinded and polished with a sequential series of wet 400 to 4000 grit silicon carbide papers and nylon adhesive backed discs with 0.25 micron diamond or colloidal silica coating. The polished slices are rinsed thoroughly with distilled water three times, sonicated in a water bath for five minutes, then rinsed again and allowed to air dry.

Etched enamel samples are prepared by treatment with 1% aqueous citric acid (pH 3.6) for 10 minutes, followed by rinsing with deionized water.

Etched human enamel samples are treated with 50 microliters of polyelectrolyte solutions A-F, or with control solutions, for ten minutes at room temperature. The samples are then rinsed with deionized water and then they are immersed in 50 mL of Remineralization Solution overnight at 37° C. Treatment and overnight immersion are repeated daily for a total of four days, with fresh Remineralization Solution used each day. The enamel samples are then rinsed with deionized water for 50 seconds and then air dried.

Koop Hardness and Percentage of Hardness Repair (% HR) are determined as described in Example 1.

The results are shown in the table below:

polyelectrolyte complexes of samples L and O provide substantially better enamel repair compared to the corresponding anion-free samples K and N, respectively. Thus, while some enamel repair results even from a solution having only a PAMAM dendrimer or PEI cationic polymer, the results are substantially improved by the formation of a polyelectrolyte complex between the cationic polymer and an anionic counterion. In addition, the addition of calcium and phosphate anions results in a significant diminishment of the enamel repair effect, as shown comparing sample L to M and sample O to P. The malic acid control further shows that no significant enamel repairing effect is obtained from an anionic carboxylate solution alone. This further demonstrates an unexpected effect that results from the combination of a cationic polymer with an anionic carboxylate to form a polyelectrolyte complex.

In addition, surface roughness and morphology are evaluated using a 3D laser scanning confocal microscope. By combining white light with a laser light source, 3D laser scanning confocal microscopes are able to scan a surface and collect both an optical image and high-resolution topographical data (such as roughness) at the same time. Roughness represents the deviation of a surface from perfect smoothness, in which there would be no variation in the topology (e.g., height) of the surface. Roughness is therefore measured in units of micrometers. Values for roughness of the acid etched enamel sample (Re) and for the acid-etched enamel sample after treatment (Rt) are determined. Percentage of roughness (% R) is calculated as follows:

$$\% R = (R_t - R_e)/(R_e) \times 100$$

The results are shown in the table below:

| Sample | K | L | M | N | O | P | Malic acid | HAP Gel | H$_2$O |
|---|---|---|---|---|---|---|---|---|---|
| % R | −54.1 | −55.0 | −54.1 | −43.4 | −48.2 | −31.7 | −1.6 | −3.6 | −24.2 |

The results demonstrate that all sample solutions provide improved smoothness (reduced roughness) compared to the deionized water negative control. In addition, sample solutions L and O show substantially improved smoothness than the HAP Gel positive control. Unexpectedly, however, the polyelectrolyte complexes of samples L and O provide similar improvement in smoothness compared to the corresponding anion-free samples K and N, respectively. The addition of calcium and phosphate anions has only a moderate effect on the smoothness results. The malic acid control further shows that no significant enhancement of smoothness is obtained from an anionic carboxylate solution alone.

Consistent with these results, the confocal microscopy imagery demonstrates increased smoothness and uniformity.

| Sample | K | L | M | N | O | P | Malic acid | H$_2$O | HAP Gel |
|---|---|---|---|---|---|---|---|---|---|
| % HR | 85.2 | 171.7 | 101.2 | 57.3 | 179.4 | 58.1 | 19.8 | −2.5 | 95.7 |

The results demonstrate that all sample solutions provide better enamel repair than the deionized water negative control (which actually shows a further loss in enamel hardness). In addition, sample solutions L and O show substantially better enamel repair than the HAP Gel positive control. However, it is particularly unexpected that the Example 3—Alpha-Polylysine Polymers (PDL and PLL)

Bovine and human enamel blocks are prepared and treated with polyelectrolyte test solutions as described in Examples 1 and 2, respectively, except that 40 microliters of the polyelectrolyte solution are applied to the etched enamel surface, instead of 50 microliters. Koop Hardness (KHN) and Percentage Hardness Repair (% HR) are determined as described in Examples 1 and 2.

Polyelectrolyte complex solutions are prepared by mixing a solution of either poly-D-lysine hydrobromide (PDL; 150,000-300,000 Da, 718-435 residues) or poly-L-lysine hydrochloride (PLL; >30,000 Da, >182 residues) with malic acid solution in appropriate ratios to provide the following formulas (solutions A and D have cationic polymer without an anionic counterpart). All solutions are adjusted to pH 7.0 using 1M aqueous NaOH. Because of the difference in molecular weight of the polymers, PLL is used at 1 mg/mL and PDL is used at 8 mg/mL, resulting in a similar charge density across the test samples:

| Sample | A | B | C | D | E | F | G | H |
|---|---|---|---|---|---|---|---|---|
| PLL (mg/mL) | — | — | — | 1 | 1 | 1 | 1 | 1 |
| PDL (mg/mL) | 8 | 8 | 8 | — | — | — | — | — |
| Malic acid (mg/mL) | 0 | 0.06 | 0.6 | 0 | 0.06 | 0.18 | 0.3 | 0.6 |
| PL/MA weight ratio | 1:0 | 1:0.06 | 1:0.6 | 1:0 | 1:0.6 | 1:0.18 | 1:0.3 | 1:0.6 |
| Amino/carboxy molar ratio | 1:0 | 1:0.1 | 1:1 | 1:0 | 1:0.1 | 1:0.3 | 1:0.5 | 1:1 |
| pH | 7.0 | 7.0 | 7.0 | 7.0 | 7.0 | 7.0 | 7.0 | 7.0 |

Distilled water and 1450 ppm sodium fluoride in distilled water solution are used as controls. The results of the human enamel tests are shown in the table below:

| Sample | A | B | C | D | E | H | NaF | $H_2O$ |
|---|---|---|---|---|---|---|---|---|
| % HR | 67.0 | 103.6 | 54.7 | 63.6 | 104.9 | 48.3 | 49.3 | 10.1 |

The results show that surface hardness was slightly increased after 4 days of treatments with water, while sodium fluoride treatment resulted in a more significant improvement, but did not reach half of original hardness levels. Surprisingly, treatment with PDL or PLL without malic acid results in greater improvements in hardness than sodium fluoride, while combining the PDL or PLL with 0.06 mg/mL malic acid improved hardness to more than 100%, but using 0.6 mg/mL malic results the results were lower than for PDL or PLL alone. Taking into account the difference in concentration and polymer length, there was no significant difference between the PDL and the PLL results.

The results of the bovine enamel tests are shown in the table below:

| Sample | D | E | F | G | H | NaF |
|---|---|---|---|---|---|---|
| % HR | 51.5 | 70.7 | 68.5 | 55.1 | 36.5 | 35.9 |

Using three concentrations of malic acid with PLL polymer, it is surprisingly found that with bovine enamel, comparable results are obtained when 0.06 or 0.18 mg/mL malic acid is combined with the PLL, with higher but poorer results with 0.3 mg/mL malic acid. Using 0.6 mg/mL malic acid produces a hardness improvement that is lower than that obtained using PLL alone, and which is comparable to using sodium fluoride.

Example 4—Improved Method for Enamel Repair Evaluation

Traditional comparative testing to evaluate the efficacy of enamel repair technologies, as described in the preceding examples, relies on various characterization methods to quantify or visualize the physical or morphological changes on enamel surfaces from different treatments. Typically, the enamel samples are examined by comparing the measurements before and after treatments. For example, the increase in the mechanical properties (such as micro-/nano-hardness and Young's modulus) have been recognized as evidence for an effective enamel repair treatment. Surface profilometry is another technique for measuring the surface roughness and recording step height that quantifies enamel loss regarding a non-treated area. These methods have been well-established for quantifying the enamel repair efficacy; however, it is challenging to visualize the changes from treatment using mechanical or profilometry measurements, or even using imaging techniques, which are difficult to quantify in a typical before/after imaging procedure. Additionally, the traditional method requires the separated measurements before and after treatments, that would increase the variability of samples and limit the accuracy for the assessments.

The inventors have therefore developed a novel methodology that is able to visualize the enamel changes from treatment while providing the capability for the quantification measurements from the same testing procedure.

As shown in FIG. 1, bovine enamel blocks are divided into three sections, termed "sound" (i.e., undamaged), "damaged" and "repaired." Polished bovine enamel blocks having a hardness of at least 300 KHN are selected and cut into square blocks of about 3×3 mm and about 2 mm thickness. The left half of the block ("sound") is covered using an acid-resistant nail polish, which is then allowed to air dry. The right half of the block ("damaged" and "repaired") is then treated with 1% citric acid (pH 3.6) for ten minutes to etch the surface. After the treatment, the surface of the block is rinsed with deionized water. The top right corner of the block ("damaged") is then covered with the same acid-resistant nail polish and air dried. The test formulation is then applied to the bottom right corner of the block ("repaired"), for example, for a ten-minute treatment, followed by rinsing with deionized water. Following the treatment, the enamel blocks are immersed in a Remineralization Solution (0.2205 g/L $CaCl_2 \cdot 2H_2O$, 0.1225 g/L $KH_2PO_4$, 9.6915 g/L KCl and 4.766 g/L HEPEs buffer, pH adjusted to 7 with NaOH) overnight at 37° C., and the process repeated for 2-4 days (the blocks immersed daily in fresh remineralization solution). Following this, the blocks are removed, rinsed with deionized water and air dried. The nail polish covers are then removed using acetone solvent, and the surface of the enamel blocks is visualized, for example, by light microscopy, confocal laser scanning microscopy, scanning probe microscopy, or scanning electron microscopy. By performing the study in this manner, variability between samples is virtually eliminated.

Example 5—Epsilon-Polylysine Polymer Solutions

Polyelectrolyte complex solutions are prepared by mixing a solution of poly-epsilon-lysine (ePL; 25-35 lysine residues, about 3200-4600 Da) with malic acid solution in appropriate ratios to provide the following formulas (solutions A, B, and D have cationic polymer without an anionic counterpart). All solutions are adjusted to about pH 6.0 using 1M aqueous NaOH:

| Sample | A | B | C | D | E |
|---|---|---|---|---|---|
| ePL (mg/mL) | 1 | 5 | 5 | 10 | 10 |
| Malic acid (mg/mL) | 0 | 0 | 0.06 | 0 | 0.06 |
| PL/MA weight ratio | 1:0 | 1:0 | 1:0.012 | 1:0 | 1:0.006 |
| Amino/carboxy molar ratio | 1:0 | 1:0 | 1:0.02 | 1:0 | 1:0.01 |

Bovine enamel blocks are prepared and treated with polyelectrolyte test solutions as described in Example 1, except that 40 microliters of the polyelectrolyte solution is applied to the etched enamel surface, instead of 50 microliters. Koop Hardness (KHN) and Percentage Hardness Repair (% HR) are determined as described in Example 1.

Distilled water (pH 6-7) and 1450 ppm sodium fluoride in distilled water solution (0.15% w/v, pH 7.3) are used as controls. The results of the bovine enamel tests are shown in the table below:

| Sample | A | B | C | D | E | NaF | H$_2$O |
|---|---|---|---|---|---|---|---|
| % HR | 38.4 | 51.2 | 62.2 | 66.3 | 84.9 | 41.0 | 22.4 |

The results show that surface hardness was slightly increased after 1 day of treatment with water, while sodium fluoride treatment resulted in a more significant improvement, but did not reach half of original hardness levels. Treatment with 1 mg/mL ePL without malic acid provides a result comparable to sodium fluoride, while treatment with 5 mg/mL or 10 mg/mL ePL without malic acid results in more significant increases in hardness. However, the combination of either 5 mg/mL or 10 mg/mL ePL with malic acid results in a statistically significant increase in repair compared to the same ePL solutions without malic acid. 10 mg/mL ePL with malic acid restores the enamel to more than 80% of the original hardness level.

Enamel repair is also evaluated using the method described in Example 4. A Keyence microscope is used to capture the surface morphology and to measure the step height of the treated samples. A Phenom ProX Desktop scanning electron microscope is used to observe the repaired enamel crystals. Bovine enable blocks are treated with either water, the sodium fluoride solution, or the 10 mg/mL ePL+ 0.06 mg/mL malic acid solution (Solution E above).

Figure 2:
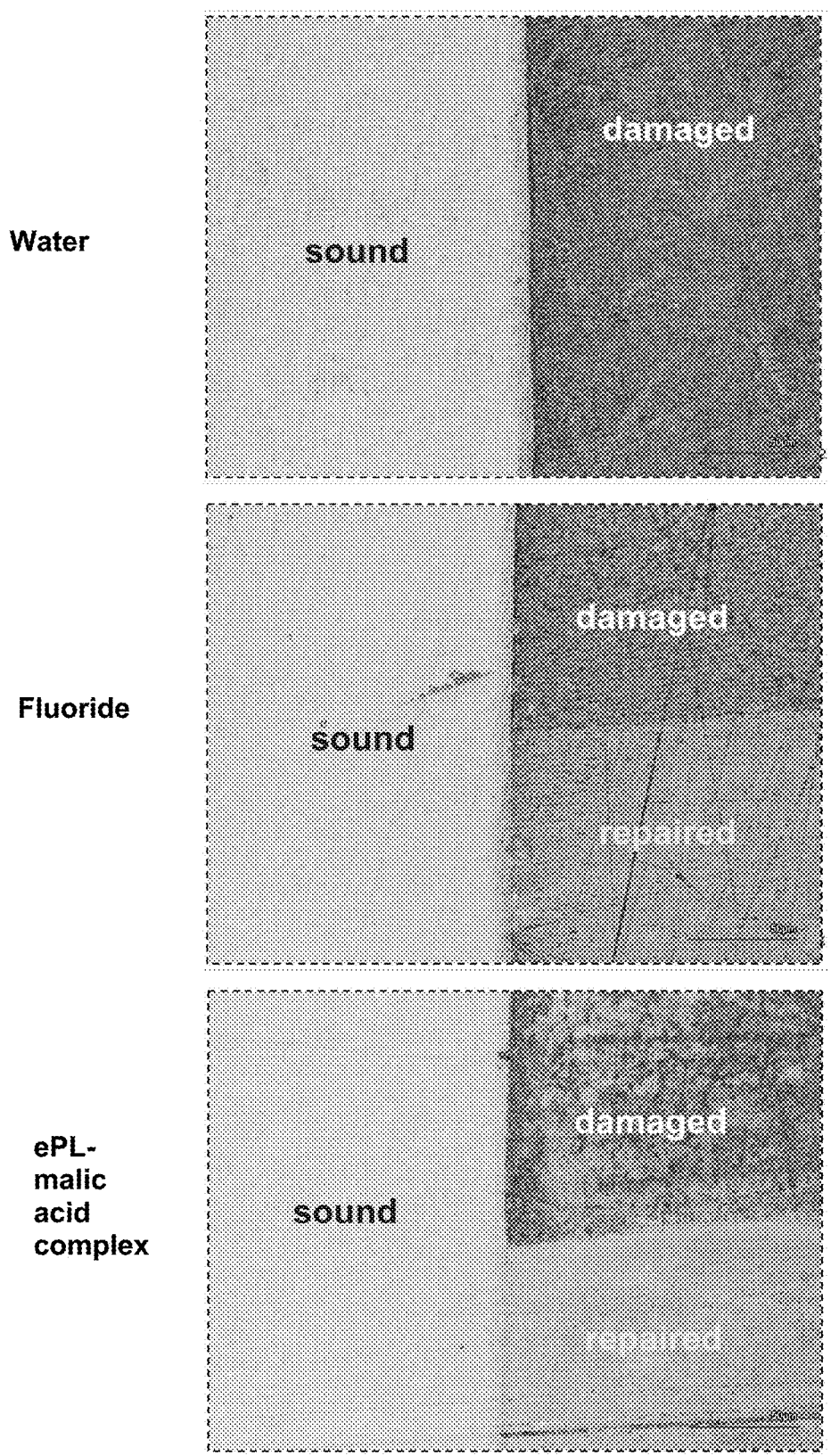
FIG. 2. Photomicroscopic images of enamel surface treated with water, sodium fluoride, or epsilon-polylysine/malic acid solutions, as described in Example 5. Scale bars are 50 microns in length.

As shown in FIG. 2, the polished "sound" portion of the enamel exhibits a smooth and bright appearance under the microscope. The acid etching procedure causes a dissolution of enamel crystals resulting in a rough and dark surface under the microscope, as seen in the "damaged" portions of the enamel. The remineralization process, with the negative control water treatment, did not change the surface morphology (i.e., the "damaged" and the "repaired" surfaces appear identical). In contrast, a clear interface between "damaged" and "repaired" sides is observed with the fluoride treated sample. The sample treated with the ePL-malic acid complex, however, shows that the "repaired" side is substantially smoother and brighter compared to the other samples, indicating a superior repair efficacy compared to other treatments.

Figure 3:
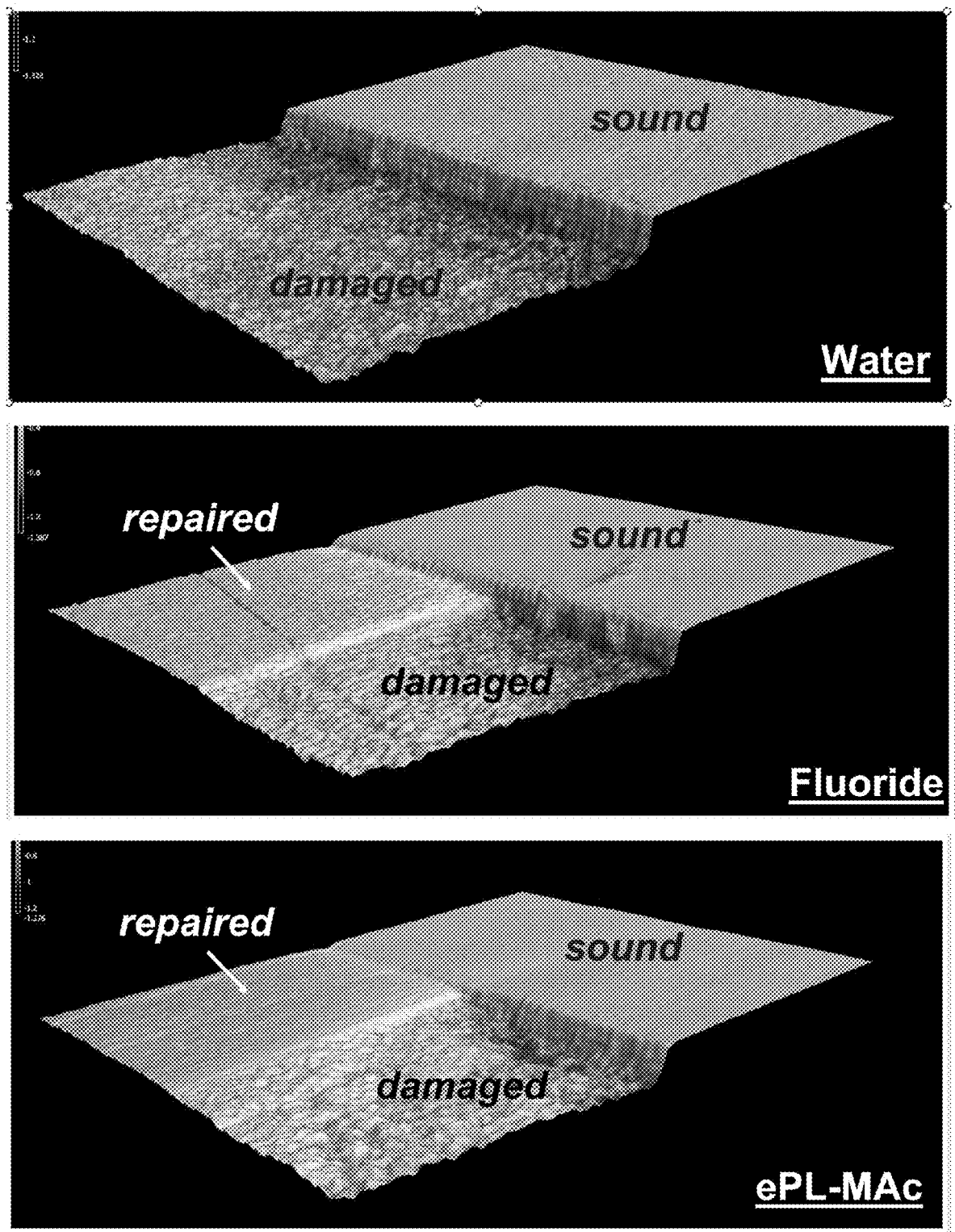
FIG. 3. Color 3D images of enamel surface treated with water, sodium fluoride, or epsilon-polylysine/malic acid solutions, as described in Example 5.
Figure 4:
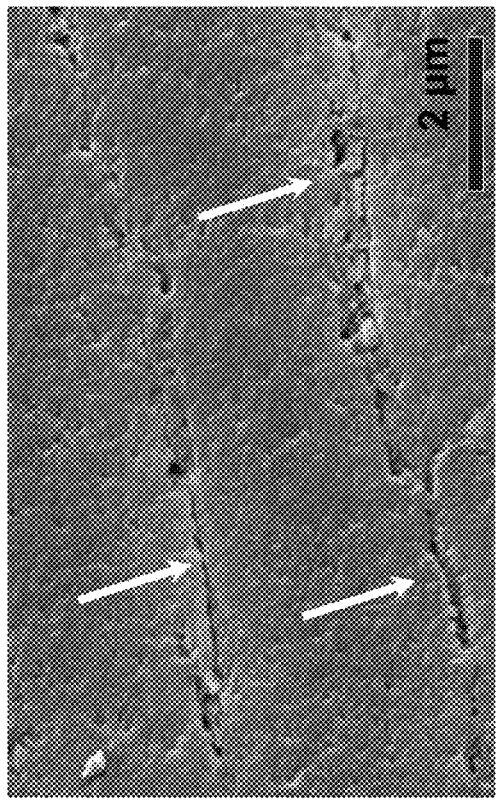
FIG. 4. Scanning electron micrographs of enamel surface treated with water, sodium fluoride, or epsilon-polylysine/malic acid solutions, as described in Example 5. Scale bars are 2 microns in length.
Figure 4:
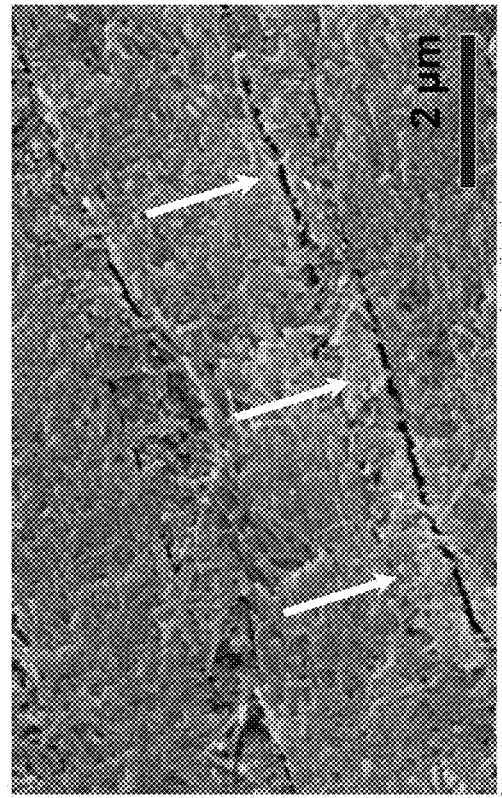
Figure 4:
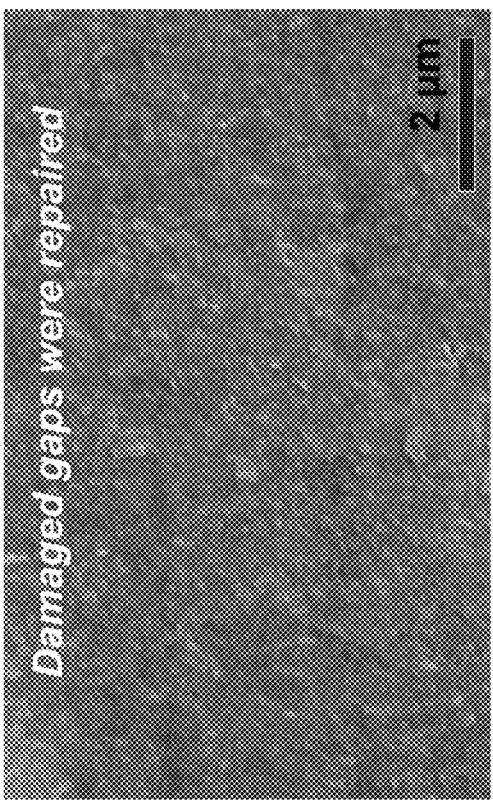
Figure 4:
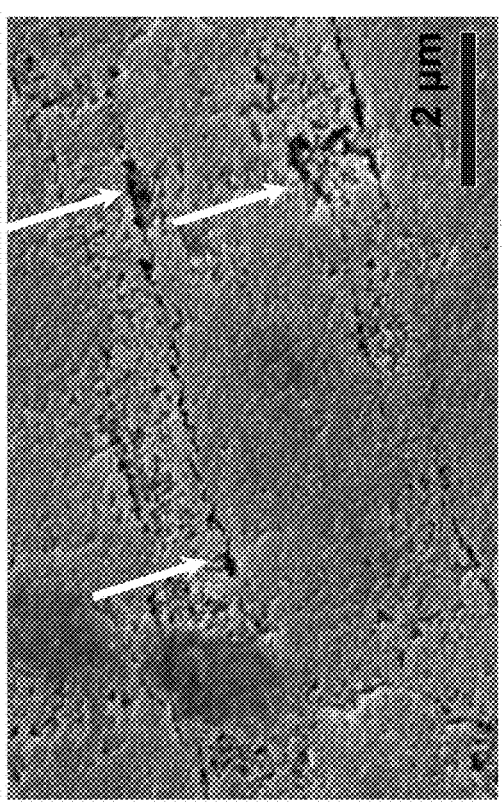

FIG. 3 shows 3-D Keyence photomicrographs color-enhanced to show the surface elevation of the enamel blocks. From these images, the step between the "sound" and "damaged" enamel portions is clearly observed, indicating a loss of minerals from the acid etching challenge. Water and fluoride treatments do not restore the enamel to the original height, but impressively, the treatment using ePL-malic acid complex restores the enamel level substantially to the height of the "sound" enamel side. Based on these images, the percentage of repair was calculated based on the change in the step height, as shown in the table below:

| Sample | E | NaF | HO |
|---|---|---|---|
| % Repair (Step height) | 87.0 | 65.3 | 30.9 |

As shown in the table, nearly 90% of recovery in step height is achieved by applying the ePL-malic acid complex on the enamel surface, which is significantly better than the results for water and fluoride treated samples.

Finally, scanning electron microscopy is used to provide a closer view at the enamel surface morphologies. As shown in FIG. 5, the results further demonstrate the superiority of ePL-malic acid complex enamel repair. Acid etching is shown to cause gaps or cracks to form in the surface of the enamel due to the dissolution of enamel crystals (see arrows in the FIG. 5, panel (a)). The remineralization process alone is not able to repair these gaps effectively, due to the limited crystallization on enamel surface (panel (b)). The damaged enamel is found to undergo some healing after being treated with fluoride, however, the gaps still could be seen on the enamel surface (panel (c)). In contrast, treatment with the ePL-malic acid complex completely repairs all gaps observed in the enamel, restoring a smooth surface (FIG. 5, panel (d)).

The effect of treatments on enamel appearance is also investigated by measuring the surface gloss and observing the surface under a microscope. The gloss values are measured using a Novo-Curve glossmeter. A glossmeter provides a quantifiable way of measuring gloss intensity, and the measurement relates to the amount of reflected light from a black glass standard with a defined refractive index. The ratio of reflected light for a test specimen, compared to the ratio for the gloss standard, is recorded as gloss units (GU). A gloss measurement of >70 GU is considered high gloss, while medium gloss is 10-70 GU, and low gloss is <10 GU.

A baseline measurement is taken on a sound enamel sample without treatment ($G_0$), on an acid-etched enamel sample ($G_e$), and on an acid-etched enamel sample after treatment ($G_t$). The percentage of gloss recovery (% GR) is calculated according to the following formula:

$$\% \ GR = (G_t - G_e)/(G_0 - G_e) \times 100.$$

The acid etching treatment is found to cause a rough surface, which exhibits a dull appearance that is associated with a low value of gloss, and the glossiness is recovered by treatment with ePL-malic acid complex, as shown in the following table:

| Sample | E | NaF | H$_2$O |
|---|---|---|---|
| % GR | 32.6 | 12.7 | 8.5 |

The results show that enamel which is acid etched for only 10 minutes results in more than a 90% loss of gloss. After 2 days of remineralization, there is no significant increase in the gloss for the sample with water treatment. With sodium fluoride treatment, the gloss recovery is slightly better than water treatment, but the result is not statistically significant. In contrast, the surface gloss is significantly improved with the samples treated with ePL-malic acid complex. The effects on enamel appearance are further confirmed by viewing the enamel surface under the Keyence microscope. It is found that the ePL-malic acid complex-treated sample exhibits a brighter and smoother surface compared to the samples from other treatments.

Example 6—Epsilon-Polylysine Polymer with Different Application Methods and Exposure Times The aforementioned aqueous solution having 1 wt. % ePL and 0.006 wt. % malic acid (98% distilled water), and a corresponding aqueous oral gel formulation having 1 wt. % ePL and 0.006 wt. % malic acid in a 4 wt. % hydroxyethyl cellulose solution (95% distilled water) are compared under typical mouthwash, oral spray, and oral gel conditions. All compositions are adjusted to pH 6 using 1 M sodium hydroxide. Sample blocks are treated as follows: (a) Solution: treatment is applied to enamel surface and left on for 10 minutes then rinsed; (b) mouthwash-style application: enamel block is immersed in solution for 1 minute then rinsed, twice in one day; (c) oral spray-type application: enamel block is sprayed once and rinsed after 5 minutes, twice in one day; (d) oral gel-style application: gel is applied to surface and left on for 5 minutes then rinsed; (e) water control: water is applied to enamel surface and left on for 10 minutes then rinsed. These application conditions are chosen to mimic real-life practice. Following the treatments, the samples are immersed in remineralization solution for 3 days, changing the solution daily. As described in Example 1, the following results are obtained:

| Sample/Application | Solution applied to surface | Surface soaked in solution | Solution sprayed on surface | Gel painted on surface | Water applied to surface |
|---|---|---|---|---|---|
| % HR | 79.7 | 62.1 | 72.8 | 81.2 | 31.6 |

It is found that the use of the spray or gel forms of the composition provide comparable results to the solution, while use of the mouthwash provides somewhat lesser improvement in hardness, but still much more than the water control. The lower effectiveness of the mouthwash is believed to be due to short application time (1 minute versus 5 or 10 minutes).

Scanning electron micrographs are consistent with the % HR results, and demonstrate effective enamel repair for all four tested compositions.

Example 7—Alternative Anionic Carboxylates

Additional experiments are carried out in the formats described in Example 1 to 6 above, wherein alternative anionic carboxylic acids are used instead of malic acid. Test acids may include one or more of: acetic acid, lactic acid, glycolic acid, tartaric acid, malic acid, malonic acid, succinic acid, glutaric acid, maleic acid, fumaric acid, mandelic acid, or citric acid.

Example 8—Oral Care Compositions

Oral care compositions comprising the polyelectrolyte polymers of the present disclosure are formulated using standard mouthwash, toothpaste, gel, spray, and other oral care composition base formulas. Either the individual cationic and anionic components of the polyelectrolyte complex may be added to, or formulated into, such a composition, or the pre-formed polyelectrolyte complex may be added to, or formulated into, such a composition.

A mouthwash composition is formulated as provided below:

| Material Description | Weight % |
|---|---|
| Water | Balance (e.g., ~78%) |
| Poloxamer (e.g., Pol oxamer 407) | 0.1-5% (e.g., 0.5%) |
| Glycerol | 0-20% (e.g., 7.5%) |
| Sorbitol | 0-20% (e.g.. 5.5%) |
| Propylene glycol | 0-20% (e.g., 7%) |
| Saccharin | 0.01-0.1% (e.g., 0.02%) |
| Cationic surfactant (e.g., cetylpyridinium chloride) | 0.01-2% (e.g., 0.04%) |
| Preservatives (e.g., potassium sorbate, benzyl alcohol) | 0.01-0.5% (e.g., 0.25%) |
| EPSILON POLYLYSINE | 0.1-10% (e.g., 1%) |
| MALIC ACID | 0.0006-0.06% (e.g., 0.006%) |
| Colors | 0.0001-0.015% (e.g., 0.0005% |
| Flavor | 0.12 |
| TOTAL | 100.0000 |
| pH | 6.4 |

An oral gel composition is formulated as provided below:

| Material Description | Weight % |
|---|---|
| Water | Balance (e.g. ~95%) |
| Neutral polymer (e.g., hydroxyethyl cellulose) | 1-30% (e.g., 4%) |
| EPSILON POLYLYSINE | 0.1-10% (e.g., 1%) |
| MALIC ACID | 0.0006-0.06% (e.g., 0.006%) |
| Colors | 0.0001-0.015% (e.g., 0.0005% |
| Flavor | 0.12 |
| TOTAL | 100.0000 |
| pH | 6.4 |

While the present invention has been described with reference to embodiments, it will be understood by those skilled in the art that various modifications and variations may be made therein without departing from the scope of the present invention as defined by the appended claims.

The invention claimed is:

1. An oral care composition, comprising:
   a polyelectrolyte complex comprising a cationic polymer and an anionic polymer or anionic carboxylate; and
   one or more orally acceptable solvents or vehicles,
   wherein the cationic polymer is a polyamino acid comprising one or more basic amino acid residues, and
   wherein the polyelectrolyte complex comprises a molar ratio of cationic polymer amino groups to anionic polymer or anionic carboxylate groups of 1:0.01 to 1:0.9.

2. The oral care composition of claim 1, wherein the polyamino acid comprising one or more basic amino acid residues is selected from lysine, arginine, and/or histidine.

3. The oral care composition of claim 1, wherein the polyamino acid is a homopolymer consisting of basic amino acid residues.

4. The oral care composition of claim 1, wherein the polyamino acid is a polylysine homopolymer.

5. The oral care composition of claim 4, wherein the polylysine homopolymer consists of D-lysine residues (DLL) or L-lysine residues (PDL).

6. The oral care composition of claim 4, wherein the polylysine homopolymer is epsilon-polylysine, optionally consisting of D-lysine residues or L-lysine residues.

7. The oral care composition of claim 5, wherein the polylysine homopolymer is selected from: alpha-poly-D-lysine having a molecular weight of 150,000-300,000 Da, and/or 700-1500 D-lysine residues, optionally as a hydrobromide salt; alpha-poly-L-lysine having a molecular weight of 30,000-60,000 Da, and/or 30-60 L-lysine residues, optionally as a hydrochloride salt; and epsilon-poly-L-lysine (ePL) having a molecular weight of 3000-5000, and/or 25-35 L-lysine residues, optionally in the form of a free base.

8. The oral care composition of claim 1, wherein the anionic carboxylate is an organic monocarboxylic, dicarboxylic, or tricarboxylic acid.

9. The oral care composition of claim 8, wherein the anionic carboxylate is malic acid.

10. The oral care composition of claim 1, wherein the polyelectrolyte complex comprises a cationic polymer selected from poly-D-lysine, poly-L-lysine and epsilon-poly-L-lysine and wherein the anionic carboxylate is an organic monocarboxylic, dicarboxylic, or tricarboxylic acid.

11. The oral care composition of claim 10, wherein the anionic carboxylate is malic acid.

12. The oral care composition of claim 8, wherein the oral care composition comprises the polyelectrolyte complex in an amount of 0.01% to 5%, or 0.05% to 5%, or 0.1% to 5%, or 0.5% to 3%, or 0.5% to 2.5%, or 0.5% to 2%, or 0.5% to 1.5%, or 0.75% to 1.25%, or 1% to 5%, or 1% to 4%, or 1% to 3% or 1% to 2%, or 1.5% to 3%, or 2% to 3%, or 1% to 2%, or 1% to 1.5%, or 1% to 1.25%, or 1% to 1.1%, by weight of the composition, optionally wherein said amount is calculated by combining the individual amounts of the cationic polymer and the anionic polymer or anionic carboxylate.

13. A method of treatment or prevention of dental caries, enamel erosion, early erosive damage, and/or enamel demineralization (including preventing pre-carious lesions from forming or progressing to caries), the method comprising the application to the oral cavity of a person in need thereof an oral care composition according to claim 1.

14. A method for repairing enamel and/or remineralizing enamel, the method comprising the application to the oral cavity of a person in need thereof an oral care composition according to claim 1.

15. The method according to claim 13, wherein the method provides an increase in enamel hardness, enamel smoothness, and/or enamel glossiness.

16. A method for cosmetically repairing the enamel surface of the teeth, the method comprising the application to the oral cavity of a person in need thereof an oral care composition according to claim 1.

* * * * *